(12) United States Patent
Ito et al.

(10) Patent No.: US 8,394,504 B2
(45) Date of Patent: Mar. 12, 2013

(54) OPTICAL PLANAR THERMOPLASTIC RESIN COMPOSITION

(75) Inventors: Shoji Ito, Suita (JP); Ken-ichi Ueda, Nara (JP); Nobuhisa Noda, Hashima (JP); Shigeru Oka, Toyonaka (JP); Shigeo Otome, Kyoto (JP); Hiroko Izumi, Tsukuba (JP)

(73) Assignee: Nippon Shokubai Co., Ltd., Osaka (JP)

( * ) Notice: Subject to any disclaimer, the term of this patent is extended or adjusted under 35 U.S.C. 154(b) by 622 days.

(21) Appl. No.: 11/661,366

(22) PCT Filed: Aug. 31, 2005

(86) PCT No.: PCT/JP2005/015901
§ 371 (c)(1),
(2), (4) Date: Feb. 28, 2007

(87) PCT Pub. No.: WO2006/025445
PCT Pub. Date: Mar. 9, 2006

(65) Prior Publication Data
US 2009/0137743 A1    May 28, 2009

(30) Foreign Application Priority Data

Aug. 31, 2004  (JP) ................................. 2004-252867
Sep. 30, 2004  (JP) ................................. 2004-288057

(51) Int. Cl.
*B32B 27/00*  (2006.01)
*B32B 27/30*  (2006.01)

(52) U.S. Cl. ... 428/500; 252/589; 359/507; 359/485.01; 428/423.1; 428/441; 428/483; 525/223; 525/330.6; 526/318; 526/318.4

(58) Field of Classification Search ............. 525/223, 525/330.6; 526/318.4, 318
See application file for complete search history.

(56) References Cited

U.S. PATENT DOCUMENTS

| | | | |
|---|---|---|---|
| 3,375,216 A | 3/1968 | Smith et al. | |
| 6,423,806 B1 | 7/2002 | Nakagawa et al. | |
| 6,673,885 B1 | 1/2004 | Shibata et al. | |
| 2002/0106568 A1* | 8/2002 | Asano et al. | ..................... 430/18 |
| 2003/0134988 A1* | 7/2003 | Asano et al. | ............... 525/330.6 |

FOREIGN PATENT DOCUMENTS

| | | |
|---|---|---|
| CN | 1367802 | 9/2002 |
| EP | 1 698 663 | 9/2006 |
| JP | 61-254608 | 11/1986 |
| JP | 61-261303 | 11/1986 |

(Continued)

OTHER PUBLICATIONS

Hanschen, Films, Orientation, Encyclopedia of Polymer Science and Technology, pp. 559-577, Oct. 2001.*

(Continued)

*Primary Examiner* — Robert C Boyle
(74) *Attorney, Agent, or Firm* — Wenderoth, Lind & Ponack, L.L.P.

(57) ABSTRACT

Disclosed is an optical planar thermoplastic resin composition including a lactone ring-containing polymer as a main component thereof, or including a lactone ring-containing polymer and at least one other thermoplastic resin. The optical planar thermoplastic resin composition of the present invention has high transparency, high heat resistance, and high optical isotropy, and therefore, can sufficiently exhibit characteristics according to various optical applications.

13 Claims, 1 Drawing Sheet

FOREIGN PATENT DOCUMENTS

| | | |
|---|---|---|
| JP | 7-178335 | 7/1995 |
| JP | 9-241323 | 9/1997 |
| JP | 9-263616 | 10/1997 |
| JP | 9-302257 | 11/1997 |
| JP | 2835396 | 10/1998 |
| JP | 11-124467 | 5/1999 |
| JP | 2000-95821 | 4/2000 |
| JP | 3081508 | 6/2000 |
| JP | 2000-230016 | 8/2000 |
| JP | 2001-40228 | 2/2001 |
| JP | 2001-151814 | 6/2001 |
| JP | 2002-60424 | 2/2002 |
| JP | 2002-120326 | 4/2002 |
| JP | 2002-138106 | 5/2002 |
| JP | 2002-254544 | 9/2002 |
| JP | 3404160 | 2/2003 |
| JP | 2003-155309 | 5/2003 |
| JP | 2003-238788 | 8/2003 |
| JP | 2003-292805 | 10/2003 |
| JP | 2004-168882 | 6/2004 |
| JP | 2005-162835 * | 6/2005 |
| JP | 2005-232357 | 9/2005 |
| WO | 2005/066267 | 7/2005 |

OTHER PUBLICATIONS

International Search Report dated Sep. 13, 2005 issued in connection with PCT/JP2005/014230.

Written Opinion of the International Searching Authority dated Aug. 26, 2005 issued in connection with PCT/JP2005/014230.

English translation of Notice of Reasons for Rejection dated Jan. 27, 2009 issued in connection with Japanese Patent Application No. 2004-364917 corresponding to the present U.S. application.

English translation of Notice of Reasons for Rejection dated Apr. 7, 2009 issued in connection with Japanese Patent Application No. 2004-364917 corresponding to the present U.S. application.

English translation of Notice of Reasons for Rejection dated Mar. 24, 2010 in JP 2004-288057 corresponding to present US Application.

German Office Action dated Oct. 18, 2010 in DE 10 2007 009 268.9-43 corresponding to present US Application (with English translation).

Taiwanese Office Action (with English translation) issued Aug. 4, 2011 in related Taiwanese Application No. 096119940.

* cited by examiner under the patent US 8,394,504 B2

OPTICAL PLANAR THERMOPLASTIC RESIN COMPOSITION

FIELD OF THE INVENTION

The present invention relates to an optical planar thermoplastic resin composition suitable for optical applications such as optical protective films, optical films, and optical sheets, the composition containing, as a main component thereof, a lactone ring-containing polymer or containing a lactone ring-containing polymer and at least one other thermoplastic resin.

BACKGROUND ART

Acrylic resins as typified by PMMA have an excellent optical performance and are therefore applied to various optical materials used as optical isotropic materials having high light transmittance, low refractive index, and low retardation. However, along with the latest developments in flat displays such as liquid crystal display devices, plasma displays, and organic EL display devices, infrared sensors, optical waveguides, and the like, there are increased demands for optical transparent polymer materials and particularly planar (e.g., film- or sheet-formed) optical transparent polymer materials.

As the characteristics required for planar optical transparent polymer materials, high transparency and high optical anisotropy are mentioned, and characteristics, for example, heat resistance, corresponding to applications, are required together with the above characteristics.

It is demanded of optical protective films used in polarizing plates and the like to have, besides high transparency and high optical isotropy, characteristics such as low photoelastic coefficient, high heat resistance, high light resistance, and high surface hardness, high mechanical strength, small wavelength dependency of the retardation, and small incident angle dependency of the retardation.

It is required for optical films such as retardation films and view angle compensation films to have, besides high transparency and high optical isotropy, characteristics such as low photoelastic coefficient, high heat resistance, high light resistance, high surface hardness, high mechanical strength, high retardation, small wavelength dependency of the retardation, and small incident angle dependency of the retardation.

It is required for optical sheets such as diffusing plates and light guide plates to have, besides high transparency and high optical isotropy, characteristics such as low photoelastic coefficient, high heat resistance, high light resistance, high surface hardness, and high mechanical strength. It is particularly desired to suppress a deterioration in optical characteristics caused by formation strain by providing higher heat resistance than polymethylmethacrylate (PMMA) used in current optical sheets.

However, conventional planar optical transparent polymer materials insufficiently satisfy the requirements for these characteristics.

On the other hand, lactone ring-containing polymers obtained by allowing a polymer having hydroxyl groups and ester groups in its molecular chain to cause lactone cyclization condensation reaction are known (see, e.g., Japanese Unexamined Patent Publications Nos. 2000-230016, 2001-151814, 2002-120326, and 2002-254544). However, because these polymers can insufficiently exhibit optical isotropy, light resistance, and surface hardness and can satisfy the requirements of mechanical strength, there has been no case in which these polymers are made into films or sheets to form planar optical transparent polymer materials. Further, in the case of increasing the content of a lactone ring structure to improve heat resistance, the optical isotropy of a film tends to deteriorate and there is therefore the case where it is difficult to obtain an optical film having low birefringence and low retardation when the lactone ring-containing polymer is only used.

DISCLOSURE OF THE INVENTION

It is an object of the present invention to provide an optical planar thermoplastic resin composition which has high transparency, high heat resistance, and high optical isotropy, and can sufficiently exhibit the characteristics according to various optical applications. Specific examples of the above characteristics according to various optical applications may include, besides high transparency and high optical isotropy, characteristics such as low photoelastic coefficient, high heat resistance, high light resistance, high surface hardness, high mechanical strength, small wavelength dependency of the retardation, and small incident angle dependency of the retardation in the case of optical protective films used in polarizing plates and the like; besides high transparency and high optical isotropy, characteristics such as low photoelastic coefficient, high heat resistance, high light resistance, and high surface hardness, high mechanical strength, small wavelength dependency of the retardation, and small incident angle dependency of the retardation in the case of optical films, such as retardation films and view angle compensation films; and besides high transparency and high optical isotropy, characteristics such as low photoelastic coefficient, high heat resistance, high light resistance, high surface hardness, and high mechanical strength, and particularly, higher heat resistance than poly methylmethacrylate (PMMA) in the case of optical sheets such as diffusing plates and light guide plates.

The inventors of the present invention have made earnest studies to attain the above object. As a result, the inventors have found that when a thermoplastic resin material containing a lactone ring-containing polymer as a main component thereof or containing a lactone ring-containing polymer and at least one other thermoplastic resin is made into a film or a sheet under the respective specific conditions, it is possible to provide an optical planar thermoplastic resin composition having optical characteristics and mechanical characteristics suitable for optical protective films, optical films, and optical sheets besides high transparency and high heat resistance.

Thus, the present invention provides an optical planar thermoplastic resin composition comprising a lactone ring-containing polymer as a main component thereof (hereinafter referred to sometimes as "the optical planar thermoplastic resin composition (A)"). The above lactone ring-containing polymer may have a lactone ring structure represented by the following formula (1):

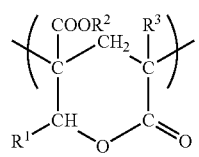

wherein $R^1$, $R^2$, and $R^3$ each independently represents a hydrogen atom or an organic residue having from 1 to 20 carbon atoms; provided that the organic residue optionally contains an oxygen atom(s).

The optical planar thermoplastic resin composition (A) may be an optical protective film. The above optical protective film may be a protective film used in a polarizing plate and/or may be a stretched film and have an in-plane retardation of from 20 to 500 nm, and may function as a retardation film.

The optical planar thermoplastic resin composition (A) may an optical film and may have an in-plane retardation of from 20 to 500 nm. The above optical film may be a retardation film or may be a view angle compensation film, and/or which may be a stretched film.

The optical planar thermoplastic resin composition (A) may be an optical sheet and may have an in-plane retardation smaller than 10 nm. The above optical film may be a diffusing plate or may be a light guide plate.

The present invention further provides an optical planar thermoplastic resin composition comprising a lactone ring-containing polymer and at least one other thermoplastic resin (hereinafter referred to sometimes as "the optical planar thermoplastic resin composition (B)"), the composition having a glass transition temperature of 120° C. or higher, an in-plane retardation of 20 nm or smaller per a thickness of 100 μm and a total light transmittance of 85% or higher. The above lactone ring-containing polymer may have a lactone ring structure represented by the following formula (1):

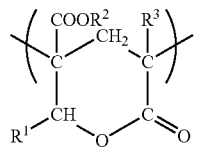

(1)

wherein $R^1$, $R^2$, and $R^3$ each independently represents a hydrogen atom or an organic residue having from 1 to 20 carbon atoms; provided that the organic residue optionally contains an oxygen atom(s). The above other thermoplastic resin may comprise a copolymer containing a vinyl cyanate type monomer unit and an aromatic vinyl type monomer unit and may preferably comprise an acrylonitrile/styrene type copolymer.

The optical planar thermoplastic resin composition of the present invention has high transparency, high heat resistance, and high optical isotropy, and can sufficiently exhibit the characteristics according to various optical applications.

Examples of the characteristics according to various optical applications may include, besides high transparency and high optical isotropy, characteristics such as low photoelastic coefficient, high heat resistance, high light resistance, high surface hardness, high mechanical strength, great retardation, small wavelength dependency of the retardation, and small incident angle dependency of the retardation in the case of optical protective films used in polarizing plates and the like; besides high transparency and high optical isotropy, characteristics such as low photoelastic coefficient, high heat resistance, high light resistance, high surface hardness, high mechanical strength, small wavelength dependency of the retardation, and small incident angle dependency of the retardation in the case of optical films such as retardation films and view angle compensation films; and besides high transparency and high optical isotropy, characteristics such as low photoelastic coefficient, high heat resistance, high light resistance, high surface hardness, and high mechanical strength, and particularly, higher heat resistance than poly methylmethacrylate (PMMA) in the case of optical sheets such as diffusing plates and light guide plates.

BRIEF DESCRIPTIONS OF THE DRAWINGS

BEST MODE FOR CARRYING OUT THE INVENTION

Figure 1:
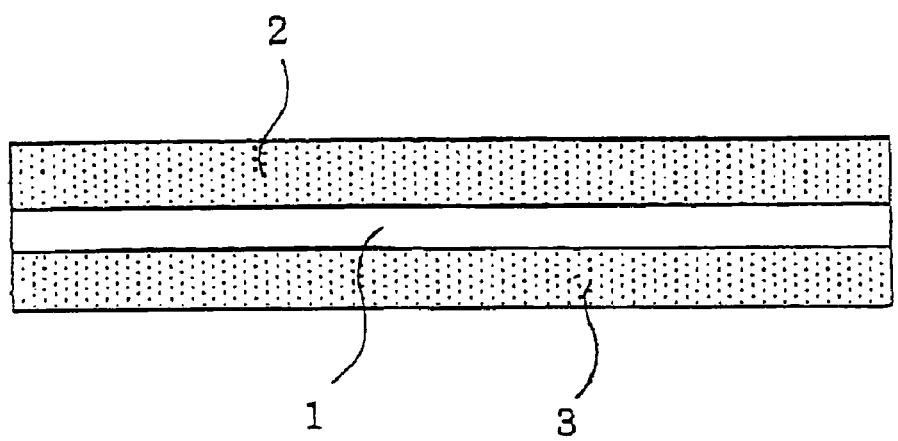
FIG. 1 is a schematic view of a polarizing plate produced in Example 5.

The present invention will hereinafter be explained in detail. However, these explanations by no means limit the scope of the present invention and embodiments other than the following embodiments may appropriately be modified and practiced without departing from the spirit of the present invention.

<<Lactone Ring-Containing Polymer>>

The optical planar thermoplastic resin composition of the present invention contains a lactone ring-containing polymer as a main component thereof or contains a lactone ring-containing polymer and at least one other thermoplastic resin.

The above lactone ring-containing polymer may have a lactone ring structure represented by the following formula (1):

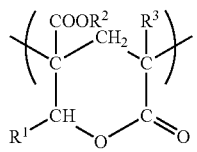

(1)

wherein $R^1$, $R^2$, and $R^3$ each independently represents a hydrogen atom or an organic residue having from 1 to 20 carbon atoms; provided that the organic residue optionally contains an oxygen atom(s).

The content of the lactone ring structure represented by the above formula (1) in the structure of the lactone ring-containing polymer may preferably be from 5% to 90% by mass, more preferably from 10% to 70% by mass, still more preferably from 10% to 60% by mass, and particularly preferably from 10% to 50% by mass. When the content of the lactone ring structure is smaller than 5% by mass, the polymer obtained may be deteriorated in heat resistance, solvent resistance, and surface hardness. In contrast, when the content of the lactone ring structure is greater than 90% by mass, the polymer obtained may be deteriorated in forming processability.

The lactone ring-containing polymer may have a structure other than the lactone ring structure represented by the above formula (1). The structure other than the lactone ring structure represented by the above formula (1) may preferably be, although it is not particularly limited to, a polymer structure unit (i.e., a repeated structure unit) formed by polymerizing at least one kind of monomer selected from the group consisting of (meth)acrylic acid esters, hydroxyl group-containing monomers, unsaturated carboxylic acids, and monomers represented by the following formula (2):

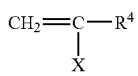

(2)

wherein $R^4$ represents a hydrogen atom or a methyl group, X represents a hydrogen atom, an alkyl group having from 1 to 20 carbon atoms, an aryl group, a —OAc group, a —CN group, a —CO—$R^5$ group, or a —CO—O—$R^6$ group wherein Ac represents an acetyl group and $R^5$ and $R^6$ each independently represents a hydrogen atom or an organic residue having from 1 to 20 carbon atoms, as described later in the production process of the lactone ring-containing polymer.

The content of a structure other than the lactone ring structure represented by the above formula (1) in the structure of the lactone ring-containing polymer may preferably be from 10% to 95% by mass, more preferably from 10% to 90% by mass, still more preferably from 40% to 90% by mass, and particularly preferably from 50% to 90% by mass in the case of a polymer structure unit (i.e., a repeated structure unit) formed by polymerizing a (meth)acrylic acid ester, and may preferably be from 0% to 30% by mass, more preferably from 0% to 20% by mass, still more preferably from 0% to 15% by mass, and particularly preferably from 0% to 10% by mass in the case of a polymer structure unit (i.e., a repeated structure unit) formed by polymerizing a hydroxyl group-containing monomer. Also, the above content may preferably be from 0% to 30% by mass, more preferably from 0% to 20% by mass, still more preferably from 0% to 15% by mass, and particularly preferably from 0% to 10% by mass in the case of a polymer structure unit (i.e., a repeated structure unit) formed by polymerizing an unsaturated carboxylic acid. Further, the above content may preferably be from 0% to 30% by mass, more preferably from 0% to 20% by mass, still more preferably from 0% to 15% by mass, and particularly preferably from 0% to 10% by mass in the case of a polymer structure unit (i.e., a repeated structure unit) formed by polymerizing a monomer represented by the above formula (2).

A process for producing a lactone ring-containing polymer is not particularly limited, but polymer (a) having hydroxyl groups and ester groups in the molecular chain thereof is obtained by a polymerization step, and then, the polymer (a) obtained is heat treated to carry out a lactone cyclization condensation step for introducing a lactone ring structure into the polymer, thereby obtaining the lactone ring-containing polymer.

In the polymerization step, for example, a polymer having hydroxyl groups and ester groups in the molecular chain thereof can be obtained by carrying out the polymerization reaction of monomer components containing a monomer represented by the following formula (3):

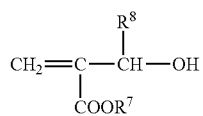

(3)

wherein $R^7$ and $R^8$ each independently represents a hydrogen atom or an organic residue having from 1 to 20 carbon atoms.

Examples of the monomer represented by the above formula (3) may include methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and t-butyl 2-(hydroxymethyl)acrylate. These monomers may be used alone or two or more kinds of these monomers may also be used in combination. In these monomers, methyl 2-(hydroxymethyl)acrylate and ethyl 2-(hydroxymethyl)acrylate may be preferred, and methyl 2-(hydroxymethyl)acrylate may particularly be preferred because it exhibits a high effect of improving heat resistance.

The content of the monomer represented by the above formula (3) in the monomer components to be subjected to the polymerization step may preferably be from 5% to 90% by mass, more preferably from 10% to 70% by mass, still more preferably from 10% to 60% by mass, and particularly preferably from 10% to 50% by mass. When the content of the monomer represented by the above formula (3) is smaller than 5% by mass, the polymer obtained may be deteriorated in heat resistance, solvent resistance, and surface hardness. In contrast, when the content of the monomer represented by the above formula (3) is greater than 90% by mass, gelation may occur in the polymerization step or in the lactone cyclization condensation step, and the polymer obtained may be deteriorated in forming processability.

The monomer components to be subjected to the polymerization step may contain a monomer other than the monomers represented by the above formula (3). Examples of such a monomer may include, although it is not particularly limited to, (meth)acrylic acid esters, hydroxyl group-containing monomers, unsaturated carboxylic acids, and monomers represented by the following formula (2):

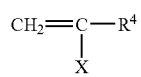

(2)

wherein $R^4$ represents a hydrogen atom or a methyl group, X represents a hydrogen atom, an alkyl group having from 1 to 20 carbon atoms, an aryl group, a —OAc group, a —CN group, a —CO—$R^5$ group, or a —CO—O—$R^6$ group wherein Ac represents an acetyl group and $R^5$ and $R^6$ each independently represents a hydrogen atom or an organic residue having from 1 to 20 carbon atoms. These monomers may be used alone, or two or more kinds of these monomers may also be used in combination.

The (meth)acrylic acid ester is not particularly limited, so long as it is a (meth)acrylic acid ester other than the monomers represented by the above formula (3). Examples of the (meth)acrylic acid ester may include acrylic acid esters such as methyl acrylate, ethyl acrylate, n-butyl acrylate, isobutyl acrylate, t-butyl acrylate, cyclohexyl acrylate, and benzyl acrylate; and methacrylic acid esters such as methyl methacrylate, ethyl methacrylate, propyl methacrylate, n-butyl methacrylate, isobutyl methacrylate, t-butyl methacrylate, cyclohexyl methacrylate, and benzyl methacrylate. These (meth)acrylic acid esters may be used alone, or two or more kinds of these (meth)acrylic acid esters may also be used in combination. In these (meth)acrylic acid esters, methyl methacrylate may particularly be preferred because the polymer obtained is excellent in heat resistance and transparency.

When a (meth)acrylic acid ester other than the monomers represented by the above formula (3) is used, the content of the (meth)acrylic acid ester in the monomer components to be subjected to the polymerization step may preferably be from 10% to 95% by mass, more preferably from 10% to 90% by mass, still more preferably from 40% to 90% by mass, and particularly preferably from 50% to 90% by mass, in view of sufficiently exhibiting the effect of the present invention.

The hydroxyl group-containing monomer is not particularly limited, so long as it is a hydroxyl group-containing monomer other than the monomers represented by the above formula (3). Examples of the hydroxyl group-containing monomer may include α-hydroxymethylstyrene, α-hydroxyethylstyrene, 2-(hydroxyalkyl)acrylic acid esters such as methyl 2-(hydroxyethyl)acrylate; and 2-(hydroxyalkyl) acrylic acids such as 2-(hydroxyethyl)acrylic acid. These hydroxyl group-containing monomers may be used alone, or two or more of these hydroxyl group-containing monomers may also be used in combination.

When a hydroxyl group-containing monomer other than the monomers represented by the above formula (3) is used, the content of the hydroxyl group-containing monomer in the monomer components to be subjected to the polymerization step may preferably be from 0% to 30% by mass, more preferably from 0% to 20% by mass, still more preferably from 0% to 15% by mass, and particularly preferably from 0% to 10% by mass, in view of sufficiently exhibiting the effect of the present invention.

Examples of the unsaturated carboxylic acid may include acrylic acid, methacrylic acid, crotonic acid, α-substituted acrylic acids, and α-substituted methacrylic acids. These unsaturated carboxylic acids may be used alone, or two or more kinds of these unsaturated carboxylic acids may also be used in combination. In these unsaturated carboxylic acids, acrylic acid and methacrylic acid may particularly be preferred because the effect of the present invention can sufficiently be exhibited.

When an unsaturated carboxylic acid is used, the content of the unsaturated carboxylic acid in the monomer components to be subjected to the polymerization step may preferably be from 0% to 30% by mass, more preferably from 0% to 20% by mass, still more preferably from 0% to 15% by mass, and particularly preferably from 0% to 10% by mass, in view of sufficiently exhibiting the effect of the present invention.

Examples of the monomers represented by the above formula (2) may include styrene, α-methylstyrene, vinyltoluene, acrylonitrile, methyl vinyl ketone, ethylene, propylene, and vinyl acetate. These monomers may be used alone, or two or more kinds of these monomers may also be used in combination. In these monomers, styrene and α-methylstyrene may particularly be preferred because the effect of the present invention can sufficiently be exhibited.

When a monomer represented by the above formula (2) is used, the content of the monomer in the monomer components to be subjected to the polymerization step may preferably be from 0% to 30% by mass, more preferably from 0% to 20% by mass, still more preferably from 0% to 15% by mass, and particularly preferably from 0% to 10% by mass, in view of sufficiently exhibiting the effect of the present invention.

The form of polymerization reaction to obtain a polymer having hydroxyl groups and ester groups in the molecular chain thereof by polymerizing monomer components may preferably be a form of polymerization using a solvent and may particularly preferably be solution polymerization.

Although the polymerization temperature and the polymerization time may vary depending upon the kind and ratio of monomers to be used and the like, for example, the polymerization temperature may preferably be from 0° C. to 150° C. and the polymerization time may preferably be from 0.5 to 20 hours, and the polymerization temperature may more preferably be from 80° C. to 140° C. and the polymerization time may more preferably be from 1 to 10 hours.

In the case of the form of polymerization using a solvent, examples of the polymerization solvent may include, although it is not particularly limited to, aromatic hydrocarbon type solvents such as toluene, xylene, and ethylbenzene; ketone type solvents such as methyl ethyl ketone and methyl isobutyl ketone; and ether type solvents such as tetrahydrofuran. These solvents may be used alone, or two or more kinds of these solvents may also be used in combination. Also, when the boiling point of a solvent is too high, the amounts of residual volatile components in the lactone ring-containing polymer finally obtained may become increased, and therefore, solvents having boiling points of from 50° C. to 200° C. may be preferred.

When the polymerization reaction is carried out, a polymerization initiator may be added, if necessary. Examples of the polymerization initiator may include, although it is not particularly limited to, organic peroxides such as cumene hydroperoxide, diisopropylbenzene hydroperoxide, di-t-butyl peroxide, lauroyl peroxide, benzoyl peroxide, t-butyl peroxyisopropylcarbonate, and t-amyl peroxy-2-ethylhexanoate; and azo compounds such as 2,2'-azobis (isobutyronitrile), 1,1-azobis-(cyclohexanecarbonitrile), and 2,2'-azobis-(2,4-dimethylvaleronitrile). These polymerization initiators may be used alone, or two or more of these polymerization initiators may also be used in combination. The amount of polymerization initiator to be used may appropriately be set depending upon the combination of monomers, the reaction conditions, and the like, although it is not particularly limited.

When the polymerization is carried out, it is preferred to control the concentration of the polymer produced in the polymerization reaction mixture to become 50% by mass or lower in order to prevent the gel formation of the reaction mixture. Specifically, when the concentration of the polymer produced in the polymerization reaction mixture is higher than 50% by mass, it is preferred that the concentration of the polymer is controlled to become 50% by mass or lower by appropriately adding the polymerization solvent to the polymerization reaction mixture. The concentration of the polymer produced in the polymerization reaction mixture may more preferably be 45% by mass or lower and still more preferably 40% by mass or lower. When the concentration of the polymer produced in the polymerization reaction mixture is too low, the productivity may be deteriorated, and therefore, the concentration of the polymer produced in the polymerization reaction mixture may preferably be 10% by mass or higher and more preferably 20% by mass or higher.

The form of appropriate addition of a polymerization solvent to the polymerization reaction mixture is not particularly limited. For example, a polymerization solvent may be added either continuously or intermittently. Thus, it is possible to more sufficiently prevent the gel formation of the reaction mixture by controlling the concentration of the polymer produced in the polymerization reaction mixture in the above manner. Particularly, even in the case of increasing the content of the lactone ring to increase the ratio of hydroxyl groups and ester groups in the molecular chain with the view of improving heat resistance, the gelation can sufficiently be suppressed. The polymerization solvent to be added may be either the same as or different from the solvent that is used in the initial charging stage of the polymerization reaction. It is, however, preferred to use the same solvent that is used in the initial charging stage of the polymerization reaction. Also, the polymerization solvent to be added may be either a single solvent composed of only one kind of solvent, or a mixed solvent composed of two or more kinds of solvents.

Although besides the polymer obtained, a solvent may usually be contained in the polymerization reaction mixture obtained when the above polymerization step is finished, it is unnecessary to take out the polymer in solid form by perfectly removing the solvent, but it is preferred to introduce the polymer containing the solvent as it is into the subsequent lactone cyclization condensation step. Also, if necessary, a solvent suitable for the subsequent lactone cyclization condensation step may be added again to the polymer after the polymer is taken out in solid form.

The polymer obtained in the polymerization step is the polymer (a) having hydroxyl groups and ester groups in the molecular chain thereof. The weight average molecular weight of the polymer (a) may preferably be from 1,000 to 2,000,000, more preferably from 5,000 to 1,000,000, still more preferably from 10,000 to 500,000, and particularly preferably from 50,000 to 500,000. The polymer (a) obtained in the polymerization step is heat treated in the subsequent lactone cyclization condensation step, so that a lactone ring structure is introduced into the polymer to produce a lactone ring-containing polymer.

The reaction for introducing a lactone ring structure into the polymer (a) is reaction in which the hydroxyl groups and ester groups present in the molecular chain of the polymer (a) cause cyclization condensation by heating to give a lactone ring structure, and an alcohol is produced as a by-product by the cyclization condensation. The lactone ring structure is formed in the molecular chain of the polymer (i.e., the main backbone of the polymer) to give high heat resistance. When the reaction rate of the cyclization condensation reaction leading a lactone ring structure is insufficient, heat resistance cannot sufficiently be improved in some cases, and the condensation reaction may occur in the middle of forming the polymer by heat treatment when forming the polymer and the produced alcohol may exist in the formed articles while generating foams or silver streaks.

The lactone ring-containing polymer obtained in the lactone cyclization condensation step may preferably have a lactone ring structure represented by the following formula (1):

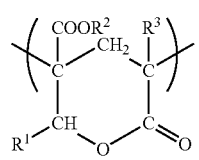

wherein $R^1$, $R^2$, and $R^3$ each independently represents a hydrogen atom or an organic residue having from 1 to 20 carbon atoms; provided that the organic residue optionally contains an oxygen atom(s).

The method of heat treating the polymer (a) is not particularly limited, but any of the heretofore known methods may be used. For example, the polymerization reaction mixture containing a solvent, which has been obtained in the polymerization step, may be heat treated as it is. Alternatively, the polymer reaction mixture may be heat treated in the presence of a solvent by using, if necessary, a ring-closing catalyst. Alternatively, the polymerization reaction mixture can also be heat treated using a heating furnace or a reaction apparatus, which is equipped with a vacuum apparatus or a devolatilizer for removing volatile components, an extruder equipped with a devolatilizer, or the like.

When the cyclization condensation reaction is carried out, other thermoplastic resins in addition to the polymer (a) may be allowed to coexist. Moreover, when the cyclization condensation reaction is carried out, an esterification catalyst or a transesterification catalyst, such as p-toluenesulfonic acid usually used as a catalyst for the cyclization condensation reaction may be used, if necessary, and an organic carboxylic acid such as acetic acid, propionic acid, benzoic acid, acrylic acid, and methacrylic acid may be used as a catalyst. In addition, for example, as disclosed in Japanese Unexamined Patent Publications Nos. 61-254608 and 61-261303, basic compounds, organic carboxylic acid salts, carbonates, or the like may also be used.

Alternatively, an organophosphorous compound may be used as the catalyst for the cyclization condensation reaction. When the organophosphorous compound is used as the catalyst, the rate of the cyclization condensation reaction can be improved, and the coloring of the lactone ring-containing polymer obtained can remarkably be reduced. Moreover, when the organophosphorous compound is used as the catalyst, a reduction in molecular weight which may probably be caused in the case of using in combination the devolatilization step explained later can be suppressed, and it is, therefore, possible to provide high mechanical strength.

Examples of the organophosphorous compound which can be used as the catalyst for the cyclization condensation reaction may include alkyl(aryl)-phosphonous acids (provided that these phosphonous acids may take the form of alkyl(aryl) phosphinic acids which are tautomers), such as methylphosphonous acid, ethylphosphonous acid, and phenylphosphonous acid, and monoesters or diesters of these phosphonous acids; dialkyl(aryl)phosphinic acids such as dimethylphosphinic acid, diethylphosphinic acid, diphenylphosphinic acid, phenylmethylphosphinic acid, and phenylethylphosphinic acid, and esters of these phosphinic acids; alkyl(aryl)phosphonic acids such as methylphosphonic acid, ethylphosphonic acid, trifluoromethylphosphonic acid, and phenylphosphonic acid, and monoesters or diesters of these phosphonic acids; alkyl(aryl)phosphinous acids such as methylphosphinous acid, ethylphosphinous acid, and phenylphosphinous acid, and esters of these phosphinous acids; phosphite monoesters, diesters, or triesters, such as methyl phosphite, ethyl phosphite, phenyl phosphite, dimethyl phosphite, diethyl phosphite, diphenyl phosphite, trimethyl phosphite, triethyl phosphite, and triphenyl phosphite; phosphate monoesters, diesters, or triesters, such as methyl phosphate, ethyl phosphate, 2-ethylhexyl phosphate, octyl phosphate, isodecyl phosphate, lauryl phosphate, stearyl phosphate, isostearyl phosphate, phenyl phosphate, dimethyl phosphate, diethyl phosphate, di-2-ethylhexyl phosphate, diisodecyl phosphate, dilauryl phosphate, distearyl phosphate, diisostearyl phosphate, diphenyl phosphate, trimethyl phosphate, triethyl phosphate, triisodecyl phosphate, trilauryl phosphate, tristearyl phosphate, triisostearyl phosphate, and triphenyl phosphate; mono-, di-, or tri-alkyl(aryl)phosphines, such as methylphosphine, ethylphosphine, phenylphosphine, dimethylphosphine, diethylphosphine, diphenylphosphine, trimethylphosphine, triethylphosphine, and triphenylphosphine; alkyl(aryl)halogen phosphines such as methyldichlorophosphine, ethyldichlorophosphine, phenyldichlorophosphine, dimethylchlorophosphine, diethylchlorophosphine, and diphenylchlorophosphine; mono-, di-, or tri-alkyl(aryl)phosphine oxides, such as methylphosphine oxide, ethylphosphine oxide, phenylphosphine oxide, dimethylphosphine oxide, diethylphosphine oxide, diphenylphosphine oxide, trimethylphosphine oxide, triethylphosphine oxide, and triphenylphosphine oxide; and tetraalkyl(aryl)-phosphonium halides such as tetramethylphosphonium chloride, tetraethylphosphonium chloride, and tetraphenylphosphonium chloride. These organophosphorous compounds may be used alone, or two or more kinds of these organophosphorous compounds may also be used in combination. In these organic phosphorus compounds, alkyl(aryl)phosphonous acids, phosphite monoesters or diesters, phosphate monoesters or diesters, and alkyl(aryl)phosphonic acids may be preferred, and alkyl(aryl)phosphonous acids, phosphite monoesters or diesters, and phosphate monoesters or diesters may be more preferred, and alkyl(aryl)-phosphonous acids and phosphate monoesters or diesters may particularly be preferred because these organophosphorous compounds have high catalytic activity and low colorability.

The amount of catalyst to be used in the cyclization condensation reaction is not particularly limited, but, for example, may preferably be from 0.001% to 5% by mass, more preferably from 0.01% to 2.5% by mass, still more preferably from 0.01% to 1% by mass, and particularly preferably from 0.05% to 0.5% by mass, relative to the polymer (a). When the amount of catalyst to be used is smaller than 0.001% by mass, the reaction rate of the cyclization condensation reaction cannot sufficiently be improved in some cases. In contrast, when the amount of catalyst to be used is greater than 5% by mass, the polymer obtained may be colored, and it may become difficult the formation of the polymer by melting because the polymer is cross-linked.

The time of adding the catalyst is not particularly limited, and the catalyst may be added, for example, in the initial stage of the reaction, during the reaction, or at the both times.

It is preferred that the cyclization condensation reaction be carried out in the presence of a solvent and a devolatilization step be combined in the cyclization condensation reaction. In this case, there are cases where the devolatilization step is combined through the whole cyclization condensation reaction and cases where the devolatilization step is not combined through the whole cyclization condensation reaction, but combined only in a part of the reaction. In the method combining the devolatilization step, an alcohol produced as a by-product is forcedly volatilized to remove it, and therefore, the equilibrium of the reaction is advantageously established on the production side.

The devolatilization step means a step of removing volatile components such as a solvent, residual monomers, and an alcohol produced as a by-product by the cyclization condensation reaction introducing a lactone ring structure, if necessary, under the conditions of reduced pressure and heating. When this removing treatment is insufficient, the amounts of residual volatile components in the polymer obtained may be increased, and therefore, coloring may occur by denaturation and formation defects such as foams and silver streaks may be generated.

In the case where the devolatilization step is combined through the whole cyclization condensation reaction, the apparatus to be used is not particularly limited, but may preferably be a devolatilizer consisting of a heat exchanger and a devolatilization vessel, an extruder with a vent, or a combination of a devolatilizer and an extruder which are connected in series, more preferably a devolatilizer consisting of a heat exchanger and a devolatilization vessel, or an extruder with a vent.

The reaction treatment temperature when the devolatilizer consisting of a heat exchanger and a devolatilization vessel is used may preferably be from 150° C. to 350° C., more preferably from 200° C. to 300° C. When the reaction treatment temperature is lower than 150° C., the cyclization condensation reaction may become insufficient, and therefore, the amounts of residual volatile components may be increased. In contrast, when the reaction treatment temperature is higher than 350° C., the polymer obtained may be colored or decomposed.

The reaction treatment pressure in the case where the devolatilizer consisting of a heat exchanger and a devolatilization vessel is used may preferably be from 931 to 1.33 hPa (from 700 to 1 mmHg), more preferably from 798 to 66.5 hPa (from 600 to 50 mmHg). When the reaction treatment pressure is higher than 931 hPa (700 mmHg), volatile components including an alcohol may easily remain. In contrast, when the reaction treatment pressure is lower than 1.33 hPa (1 mmHg, it may become difficult to carry out the step industrially.

When the extruder with a vent is used, the extruder may be provided with either one vent or two or more vents. It is, however, preferred that the extruder be provided with two or more vents.

The reaction treatment temperature in the case where the extruder with a vent is used may preferably be from 150° C. to 350° C., more preferably from 200° C. to 300° C. When the reaction treatment temperature is lower than 150° C., the cyclization condensation reaction may become insufficient, and the amounts of residual volatile components may be increased. In contrast, when the reaction treatment temperature is higher than 350° C., the polymer obtained may be colored or decomposed.

The reaction treatment pressure in the case where the extruder with a vent is used may preferably be from 931 to 1.33 hPa (from 700 to 1 mmHg), more preferably from 798 to 13.3 hPa (from 600 to 10 mmHg). When the reaction treatment pressure is higher than 931 hPa (700 mmHg), volatile components including an alcohol may easily remain. In contrast, when the reaction treatment pressure is lower than 1.33 hPa (1 mmHg), it may become difficult to carry out the step industrially.

In the case where the devolatilization step is combined through the whole cyclization condensation reaction, the physical properties of the lactone ring-containing polymer obtained may be deteriorated under severe heat treatment conditions as will be explained later. It is, therefore, preferred to carry out the step under as mild conditions as possible by using the above-described catalyst for the dealcoholization reaction in an extruder with a vent.

In the case where the devolatilization step is combined through the whole cyclization condensation reaction, the polymer (a) obtained in the polymerization step may preferably be introduced together with a solvent into a cyclization condensation reaction system. In this case, the polymer (a) may be passed again, if necessary, through a cyclization condensation reaction apparatus such as an extruder with a vent.

The case may be employed where the devolatilization step is not combined through the whole cyclization condensation reaction, but combined in a part of the reaction. For example, such a case is exemplified where the apparatus in which the polymer (a) has been produced is further heated and a part of the devolatilization step is combined, if necessary, to allow the cyclization condensation reaction to proceed in advance to some extent, and then subsequently, the cyclization condensation reaction combined with a devolatilization step at the same time is carried out to complete the reaction.

In the above-described case where the devolatilization step is combined through the whole cyclization condensation reaction, the polymer (a) may partly be decomposed before it undergoes the cyclization condensation reaction due to a difference in thermal hysteresis when the polymer (a) is heat treated at a high temperature around or above 250° C. by using a twin-screw extruder, so that the physical properties of the lactone ring-containing polymer may be deteriorated. For this, when the cyclization condensation reaction is carried out to proceed to some extent in advance before the cyclization condensation reaction combined with the devolatilization step at the same time is carried out, this is preferred because the reaction conditions in the latter half of the reaction can be made milder and a deterioration in the physical properties of the lactone ring-containing polymer obtained can, therefore, be suppressed. Particularly preferred cases may include cases where the devolatilization step is started with an interval of certain time after the start of the cyclization condensation reaction, that is, cases where hydroxyl groups and ester groups present in the molecular chain of the polymer (a) obtained in the polymerization step are allowed to undergo cyclization condensation reaction in advance to raise the rate of cyclization condensation reaction to some extent, and subsequently, the cyclization condensation reaction combined with the devolatilization step at the same time is carried out. More specifically, preferred cases may include cases where the cyclization condensation reaction is allowed to proceed to a certain reaction rate in the presence of a solvent in advance in a vessel type reactor and then the cyclization condensation reaction is completed by using a reactor provided with a devolatilizer, for example, a devolatilizer consisting of a heat exchanger and a devolatilization vessel, or an extruder with a vent. Particularly, in these cases, it is more preferred that a catalyst for the cyclization condensation reaction is present.

As described above, the method in which hydroxyl groups and ester groups present in the molecular chain of the polymer (a) obtained in the polymerization step are allowed to undergo cyclization condensation reaction in advance to raise the rate of cyclization condensation reaction to some extent, and subsequently, the cyclization condensation reaction combined with the devolatilization step at the same time is carried out, is a preferred case to obtain a lactone ring-containing polymer in the present invention. This case makes it possible to obtain a lactone ring-containing polymer which has a higher glass transition temperature, which is more improved in the rate of cyclization condensation reaction, and which is excellent in heat resistance. In this case, the standard of the cyclization condensation reaction rate is, for example, as follows: the weight loss rate within a temperature range of from 150° C. to 300° C. in the dynamic TG measurement shown in Examples may preferably be 2% or smaller, more preferably 1.5% or smaller, and still more preferably 1% or smaller.

Examples of the reactor which may be employed in the cyclization condensation reaction carried out in advance before the main cyclization condensation reaction combined with the devolatilization step at the same time is carried out, may include, although it is not particularly limited to, an autoclave, a vessel type reactor, and a devolatilizer consisting of a heat exchanger and a devolatilization vessel. Further, an extruder with a vent which is suitable for the cyclization condensation reaction combined with the devolatilization step at the same time may also be used. In these reactors, an autoclave and a vessel type reactor may particularly be preferred. However, even in the case where a reactor such as an extruder with a vent is used, the cyclization condensation reaction may be carried out under the same reaction conditions as those in the case of an autoclave or a vessel type reactor by making vent conditions milder, avoiding the use of a vent, and controlling temperature conditions, barrel conditions, a screw shape, and screw operating conditions.

In the cyclization condensation reaction carried out in advance before the cyclization condensation reaction combined with the devolatilization step at the same time is carried out, the following methods are given as examples: (i) a method in which a mixture containing the polymer (a) obtained in the polymerization step and a solvent is heated to react by adding a catalyst, (ii) a method in which the above mixture is reacted under heating in the absence of a catalyst, and a method in which the above method (i) or (ii) is carried out under pressure.

The term "a mixture containing the polymer (a) and a solvent" to be introduced into the cyclization condensation reaction in the lactone cyclization condensation step means the polymerization reaction mixture itself obtained in the polymerization step or the mixture obtained by adding a solvent suitable for the cyclization condensation reaction again after the solvent contained in the reaction mixture was removed.

Examples of the solvent which can be added again in the cyclization condensation reaction carried out in advance before the cyclization condensation reaction combined with the devolatilization step at the same time is carried out may include, although it is not particularly limited to, aromatic hydrocarbons such as toluene, xylene, and ethylbenzene; ketones such as methyl ethyl ketone and methyl isobutyl ketone; chloroform, dimethylsulfoxide, and tetrahydrofuran. These solvents may be used alone, or two or more kinds of these solvents may also be used in combination. It is preferred to use the same solvent as that used in the polymerization step.

Examples of the catalyst to be added in the method (i) may include esterification catalysts or ester exchange catalysts such as p-toluenesulfonic acid which are usually used, basic compounds, organic carboxylic acid salts, and carbonates. In the present invention, it is preferred to use the above-described organophosphorous compounds. The time of adding a catalyst is not particularly limited, but the catalyst may be added in the initial stage of the reaction, during the reaction, or at the both times. The amount of catalyst to be added is not particularly limited, but may preferably be from 0.001% to 5% by mass, more preferably from 0.01% to 2.5% by mass, still more preferably from 0.01% to 0.1% by mass, and particularly preferably from 0.05% to 0.5% by mass, relative to the mass of the polymer (a). The heating temperature and heating time in the method (i) are not particularly limited, but the heating temperature may preferably be from room temperature to 180° C., more preferably from 50° C. to 150° C., and the heating time may preferably be from 1 to 20 hours, more preferably from 2 to 10 hours. When the heating temperature is lower than room temperature or the heating time is shorter than 1 hour, the rate of the cyclization condensation reaction may be decreased. When the heating temperature is greater than 180° C. or the heating time is longer than 20 hours, the resin may be colored or decomposed.

The method (ii) may be carried out using a pressure vessel type reactor or the like by heating the polymerization reaction mixture obtained in the polymerization step as it is. The heating temperature and heating time in the method (ii) are not particularly limited, but the heating temperature may preferably be from 100° C. to 180° C., more preferably from 100° C. to 150° C., and the heating time may preferably be from 1 to 20 hours, more preferably from 2 to 10 hours. When the heating temperature is lower than 100° C. or the heating time is shorter than 1 hour, the rate of the cyclization condensation reaction may be decreased. When the heating temperature is higher than 180° C. or the heating time is longer than 20 hours, the resin may be colored or decomposed.

Any of these methods may be carried out under pressure without any problem although depending upon the conditions.

In the cyclization condensation reaction carried out in advance before the cyclization condensation reaction combined with the devolatilization step at the same time is carried out, a part of the solvent may be allowed to vaporize naturally during the reaction without any problem.

The weight loss rate within a temperature range of from 150° C. to 300° C. in the measurement of dynamic TG may preferably be 2% or lower, more preferably 1.5% or lower, and still more preferably 1% or lower when the cyclization condensation reaction carried out in advance before the cyclization condensation reaction combined with the devolatilization step at the same time is completed, that is, just before the start of the devolatilization step. When the weight loss rate is higher than 2%, the cyclization condensation reaction rate cannot sufficiently be increased to a high level in some cases, even if the cyclization condensation reaction combined the devolatilization step at the same time is subsequently carried out, and therefore, the physical properties of the lactone ring-containing polymer obtained may be deteriorated. In addition to the polymer (a), any other thermoplastic resin is allowed to exist when the above cyclization condensation reaction is carried out.

In the case where hydroxyl groups and ester groups present in the molecular chain of the polymer (a) obtained in the polymerization step are allowed to undergo cyclization condensation reaction in advance to raise the rate of cyclization condensation reaction to some extent, and subsequently, the cyclization condensation reaction combined with the devolatilization step at the same time is carried out, the polymer (i.e., a polymer in which at least a part of the hydroxyl groups and ester groups present in the molecular chain have caused cyclization condensation reaction) obtained in advance by the cyclization condensation reaction and the solvent may be introduced into the cyclization condensation reaction combined with the devolatilization step at the same time either as it is or after, if necessary, the above polymer (i.e., a polymer in which at least a part of the hydroxyl groups and ester groups have caused cyclization condensation reaction) is isolated and other treatments are carried out, for example, a solvent is added again.

The devolatilization step may be unnecessarily finished simultaneously when the cyclization condensation reaction is completed, but may be finished with an interval of certain time after the cyclization condensation reaction is finished.

The weight average molecular weight of the lactone ring-containing polymer may preferably be from 1,000 to 2,000,000, more preferably from 5,000 to 1,000,000, still more preferably from 10,000 to 500,000, and particularly preferably from 50,000 to 500,000.

The lactone ring-containing polymer may preferably have a weight loss rate of 1% or lower, more preferably 0.5% or lower, and still more preferably 0.3% or lower in a temperature range of from 150° C. to 300° C. in the measurement of dynamic TG.

The lactone ring-containing polymer has a high cyclization condensation reaction rate, and it is, therefore, possible to avoid the drawback that the formed article obtained after formation has foams or silver streaks. Moreover, a lactone ring structure can sufficiently be introduced into the polymer, so that the lactone ring-containing polymer obtained can have sufficiently high heat resistance.

When a chloroform solution containing the lactone ring-containing polymer in a concentration of 15% by mass is prepared, the degree of coloration (YI) of the solution may preferably be 6 or lower, more preferably 3 or lower, still more preferably 2 or lower, and particularly preferably 1 or lower. When the degree of coloration (YI) is higher than 6, the transparency may be damaged by coloration, and therefore, the polymer cannot be used in the originally intended applications.

The 5% weight loss temperature of the lactone ring-containing polymer in the thermogravimetric analysis (TG) may preferably be 330° C. or higher, more preferably 350° C. or higher, and still more preferably 360° C. or higher. The 5% weight loss temperature in the thermogravimetric analysis (TG) is an index of thermal stability, and when it is lower than 330° C., sufficient thermal stability cannot be exhibited in some cases.

The glass transition temperature (Tg) of the lactone ring-containing polymer may preferably be 115° C. or higher, more preferably 125° C. or higher, still more preferably 130° C. or higher, particularly preferably 135° C. or higher, and most preferably 140° C. or higher.

The total amount of residual volatile components contained in the lactone ring-containing polymer may preferably be 5,000 ppm or smaller, more preferably 2,000 ppm or smaller, still more preferably 1,500 ppm, and particularly preferably 1,000 ppm. When the total amount of residual volatile components is greater than 5,000 ppm, this becomes a cause of formation defects such as coloring, foaming, and silver streaks, all of which are caused by denaturation of the polymer during formation and the like.

The total light transmittance of a formed article obtained by injection molding of the lactone ring-containing polymer may preferably be 85% or higher, more preferably 88% or higher, and still more preferably 90% or higher, when measured by a method according to ASTM-D-1003. The total light transmittance is an index of transparency, and when the total light transmittance is lower than 85%, transparency is decreased, and therefore, the formed article cannot be used in the originally intended applications.

<<Optical Planar Thermal Plastic Resin Composition (A)>>

The optical planar thermoplastic resin composition (A) of the present invention comprises a lactone ring-containing polymer as a main component thereof.

The content of the lactone ring-containing polymer in the optical planar thermoplastic resin composition (A) may preferably be from 50% to 100% by mass, more preferably from 60% to 100% by mass, still more preferably from 70% to 100% by mass, and particularly preferably from 80% to 100% by mass. When the content of the lactone ring-containing polymer in the optical planar thermoplastic resin composition (A) is smaller than 50% by mass, the effect of the present invention cannot sufficiently be exhibited in some cases.

The optical planar thermoplastic resin composition (A) may contain a polymer (hereinafter referred to sometimes as "at least one other polymer") other than the lactone ring-containing polymer as at least one other component.

Examples of the at least one other polymer may include olefin type polymers such as polyethylene, polypropylene, ethylene-propylene copolymers, and poly(4-methyl-1-pentene); vinyl halide type polymers such as polyvinyl chloride, polyvinylidene chloride, and chlorinated vinyl resins; acrylic type polymers such as polymethyl methacrylate; styrene type polymers such as polystyrene, styrene-methyl methacrylate copolymers, styrene-acrylonitrile copolymers, and acrylonitrile-butadiene-styrene block copolymers; polyesters such as polyethylene terephthalate, polybutylene terephthalate, and polyethylene naphthalate; polyamides such as nylon 6, nylon 66, and nylon 610; polyacetals; polycarbonates; polyphenylene oxides; polyphenylene sulfides; polyether ether ketones; polysulfones; polyether sulfones; polyoxybenzylenes; polyamideimides; and rubber like polymers such as ABS resins and ASA resins mixed with polybutadiene type rubbers or acrylic type rubbers.

The content of the other polymer in the optical planar thermoplastic resin composition (A) may preferably be from 0% to 50% by mass, more preferably from 0% to 40% by mass, still more preferably from 0% to 30% by mass, and particularly preferably from 0% to 20% by mass.

The optical planar thermoplastic resin composition (A) may contain various additives. Examples of the additives may include antioxidants such as those of the hindered phenol type, those of the phosphorous type, and those of the sulfur type; stabilizers such as light resistant stabilizers, weatherability stabilizers, and thermal stabilizers; reinforcing materials such as glass fibers and carbon fibers; ultraviolet absorbers such as phenyl salicylate, (2,2'-hydroxy-5-methylphenyl) benzotriazole, and 2-hydroxybenzophenone; near-infrared absorbers; flame retardants such as tris(dibromopropyl)phosphate, triaryl phosphate, and antimony oxide; antistatic agents such as surfactants of the anionic type, surfactants of the cationic type, and surfactants of the nonionic type; colorants such as inorganic pigments, organic pigments, and dyes; organic fillers and inorganic fillers; resin modifiers; organic filling agents and inorganic filling agents; plasticizers; lubricants; antistatic agents; and flame retardants.

The content of the additives in the optical planar thermoplastic resin composition (A) may preferably be from 0% to 5% by mass, more preferably from 0% to 2% by mass, and still more preferably from 0% to 0.5% by mass.

The method for producing the optical planar thermoplastic resin composition (A) is not particularly limited, but, for example, the lactone ring-containing polymer and, if necessary, at least one other polymer and an additive(s) may be thoroughly mixed using any of the heretofore known methods and then formed into a planar shape. The planar form may preferably be a film form or a sheet form.

In the present invention, the optical planar thermoplastic resin composition (A) having a film form is assumed to have a thickness smaller than 350 µm, and the optical planar thermoplastic resin composition (A) having a sheet form is assumed to have a thickness of 350 µm or greater, to distinguish both forms from each other.

The optical planar thermoplastic resin composition (A) having a film form may preferably have a thickness of not smaller than 1 µm and smaller than 350 µm, more preferably not smaller than 10 µm and smaller than 350 µm. When the thickness is smaller than 1 µm, sufficient mechanical strength cannot be exhibited in some cases, and therefore, the film may easily be broken when stretched.

The optical planar thermoplastic resin composition (A) having a sheet form may preferably have a thickness of from 350 µm to 10 mm, more preferably from 350 µm to 5 mm. When the thickness is greater than 10 mm, it may be difficult to obtain a uniform thickness.

Since the optical planar thermoplastic resin composition (A) of the present invention has high transparency, the total light transmittance thereof may preferably be 80% or higher, more preferably 85% or higher, still more preferably 90% or higher, and particularly preferably 92% or higher.

The tensile strength of the optical planar thermoplastic resin composition (A) of the present invention when measured according to ASTM-D-882-61T may preferably be not lower than 10 MPa and lower than 100 MPa, more preferably not lower than 30 MPa and lower than 100 MPa. When the tensile strength is lower than 10 MPa, mechanical strength cannot be exhibited in some cases. In contrast, when the tensile strength is higher than 100 MPa, processability may be deteriorated.

The rate of elongation of the optical planar thermoplastic resin composition (A) of the present invention when measured according to ASTM-D-882-61T may preferably be 1% or greater. The upper limit of the rate of elongation may preferably be 100% or smaller in usual cases, although it is not particularly limited. When the rate of elongation is smaller than 1%, toughness may be deteriorated.

The tensile modulus of the optical planar thermoplastic resin composition (A) of the present invention when measured according to ASTM-D-882-61T may preferably be 0.5 GPa or greater, more preferably 1 GPa or greater, and more preferably 2 GPa or greater. The upper limit of the tensile modulus may preferably be 20 GPa or smaller in usual cases, although it is not particularly limited. When the tensile modulus is smaller than 0.5 GPa, sufficient mechanical strength cannot be exhibited in some cases.

The optical planar thermoplastic resin composition (A) of the present invention may be provided with various functional coating layers which are respectively laminated and applied thereon depending upon the purpose, these functional coating layers including antistatic layers, adhesive and sticky layers, adhesive layers, easy adhesive layers, non-glare layers, contamination preventive layers such as photocatalyst layers, antireflection layers, hard coating layers, ultraviolet shielding layers, heat ray shielding layers, electromagnetic shielding layers, and layers having gas barrier characteristics. Also, the optical planar thermoplastic resin composition (A) may be a laminate on which members coated with the respective functional coating layers are laminated through a sticky agent or an adhesive. In this case, the order of lamination of the respective layers and the method of lamination are not particularly limited.

The ultraviolet shielding layer is provided to prevent the ultraviolet deterioration of materials, such as a base material layer and a printing layer, which are lying under the ultraviolet shielding layer and are deteriorated by ultraviolet rays. As the ultraviolet shielding layer, there may be used materials obtained by adding an ultraviolet absorber having a molecular weight of 1,000 or lower to thermoplastic resins, such as acrylic type resins, polyester type resins, or fluorinated resins, or to curable resins such as those of the heat-curable type, those of the moisture-curable type, those of the ultraviolet ray-curable type, or those of the electron ray-curable type. Particularly, acrylic type polymers obtained by polymerizing a monomer mixture essentially containing a monomer having an ultraviolet absorbing structure as disclosed in Japanese Patent Publications Nos. 3081508, 3404160, and 2835396 may be preferred from the viewpoint of weatherability. Examples of the commercially available products of the acrylic type polymer may include "HALSHYBRID UV-G13" and "HALSHYBRID UV-G301" (both available from Nippon Shokubai Co., Ltd.) and "ULS-935LH" (available from Ipposha Oil Industries Co., Ltd.).

The heat ray shielding layer is provided to prevent the malfunction of peripheral devices caused by near-infrared rays (particularly at from 700 to 1,200 nm) generated along with the emission of, for example, a display device. As the heat ray shielding layer, there may be used materials obtained by adding an organic or inorganic type heat ray shielding material to thermoplastic resins such as acrylic type resins, polyester type resins, or fluorinated resins, or to curable resins such as those of the heat-curable type, those of the moisture-curable type, those of the ultraviolet ray-curable type, or those of the electron ray-curable type. The organic type heat ray shielding material is not particularly limited, so long as it is any of the materials, such as phthalocyanine dyes, diimonium type dyes, and squarillium type dyes, which have absorption in the near-infrared region (from 700 to 1,800 nm). Depending upon the applications, there may be used a combination of dye or dyes, such as porphyrin type dyes or cyanine type dyes, which have absorption in the visible region (from 400 to 700 nm), and one kind or two or more kinds of the above materials which have absorption in the near-infrared region. Examples of the inorganic type heat ray shielding material may include metals, metal nitrides, and metal oxides. In these materials, fine particles of metal oxides may preferably be used from the viewpoint of solubility in a dispersion medium and weatherability. As the metal oxide, indium oxide type oxides and zinc oxide type oxides may be preferred, and those having an average particle diameter of 0.1 µm or smaller may be preferred from the viewpoint of transparency.

Examples of the materials for the sticking and adhesive layer may include acrylic resin, acrylic acid ester resins, or copolymers of these resins, rubbers such as styrene-butadiene copolymer, polyisoprene rubber, and polyisobutylene rubber, polyvinyl ether type, silicone type, maleimide type, and cyanoacrylate type sticking and adhesive agents. Although these materials may be used alone, a crosslinking agent and an adhesion imparting agent may further be added. An acrylic type resins which are copolymers containing an alkyl acrylate as a main component thereof may be preferred from the viewpoint of optical characteristics, light resistance, and transparency; and an adhesive of which the refractive index is adjusted near to that of the optical planar thermoplastic resin composition (A) by adding an aromatic adhesion imparting agent may be more preferred. If necessary, the above heat ray shielding material, for example, a phthalocyanine dye or a cyanine dye may be mixed in the adhesive to prepare a functional adhesive layer. This is advantageous from the viewpoint of thinning the layer as an optical laminate and improving productivity.

The electromagnetic shielding layer is provided to prevent an adverse influence of electromagnetic wave generated by the emission from a display device on living bodies and electronic devices. The electromagnetic wave shielding layer is composed of a thin film of a metal or a metal oxide, such as silver, copper, indium oxide, zinc oxide, indium tin oxide, and antimony tin oxide. These thin films may be produced by utilizing any of the heretofore known dry plating methods such as vacuum vapor deposition method, ion plating method, sputtering method, CVD method, and plasma chemical vapor deposition method. Most frequently used as the electromagnetic wave shielding layer is a thin film of indium tin oxide (abbreviated sometimes as "ITO"). However, a copper thin film having mesh-like holes and a laminate prepared by laminating dielectric layers and metal layers alternately may preferably be used. Examples of the dielectric layer may include transparent metal oxides such as indium oxide and zinc oxide. The metal layer may usually be a layer of silver or silver-palladium alloy. The laminate may usually be obtained by laminating a dielectric layer first and also laminating such that it has odd layers selected from about 3 to 13 layers.

The antireflection layer serves to suppress the reflection on the surface to prevent direct reflection of external light such as a fluorescent light on the surface. As to the structure of the antireflection layer, there are the case where the antireflection layer is composed of a thin film of an inorganic material such as a metal oxide, a fluoride, a silicate, a borate, a carbide, a nitride, or a sulfide, and the case where it is a laminate obtained by laminating resins having different refractive indices as a single layer or a multilayer. Also used is a laminate obtained by laminating thin films containing composite fine particles of an inorganic type compound and an organic type compound as disclosed in Japanese Unexamined Patent Publication No. 2003-292805.

The non-glare layer is provided to widen the view angle and to scatter transmitted light. The non-glare layer is formed by making an ink using fine particles such as silica, a melamine resin, and an acrylic resin and by applying the ink on other functional layer by any of the heretofore known methods, followed by heat- or photo-curing. Also, a film which has been subjected to non-glare treatment may be applied to other functional film.

The hard coat layer is formed on the optical planar thermoplastic resin composition (A) by applying a coating solution prepared by dissolving or dispersing a silicone type curable resin, an organic polymer composite inorganic fine particles-containing curable resin, an acrylate, such as urethaneacrylate, epoxyacrylate, and polyfunctional acrylate, as well as a photoinitiator in an organic solvent by using any of the heretofore known coating methods such that preferably, the hard coat layer is positioned as the outermost layer, followed by drying and photo-curing the coating layer. The silicone type curable resin is a resin having siloxane bonds, and examples of the silicone type curable resin may include partially hydrolyzed products of trialkoxysilane and tetraalkoxysilane or alkylated materials of these alkoxysilanes, hydrolyzed products of a mixture of methyltrialkoxysilane and phenyltrialkoxysilane, and partially hydrolyzed condensates of colloidal silica filled organotrialkoxysilane. Examples of the commercially available products of the hard coat layer material include "Si COAT 2" (available from Daihachi Chemical Industry Co., Ltd.), "TOSGUARD 510" and "UVHC8553" (both available from GE Toshiba Silicone Co., Ltd.), and "SOLGUARD NP720", "SOLGUARD NP730", and "SOLGUARD RF0831" (all available from Nippon Dacro Shamlock Co., Ltd.). Also, the organic polymer composite inorganic fine particles mean composite inorganic fine particles prepared by fixing an organic polymer to the surface of inorganic fine particles. When the surface protective layer is formed using a curable resin containing these composite inorganic fine particles, this improves, for example, surface hardness. The details of the composite inorganic fine particles and their production process are described in, for example, Japanese Unexamined Patent Publications Nos. 7-178335, 9-302257, and 11-124467. The curable resin which is allowed to contain the composite inorganic fine particles is not particularly limited. Examples of the curable resin may include melamine resins, urethane resins, alkyd resins, acrylic resins, and polyfunctional acrylic resins. Examples of the polyfunctional acrylic resin may include resins such as polyol acrylate, polyester acrylate, urethaneacrylate, and epoxyacrylate. Examples of the commercially available products of the composite inorganic fine particles-containing curable resin may include "UWC-3300" and "UWC-3600" (both available from Nippon Shokubai Co., Ltd.).

<Optical Protective Film>

A preferred embodiment of the optical planar thermoplastic resin composition (A) of the present invention is an optical protective film (hereinafter referred to sometimes as "the optical protective film of the present invention").

The optical protective film of the present invention is not particularly limited, so long as it is a film protecting transparent optical parts. Preferred specific examples of the optical protective film may include protective films used in polarizing plates used in liquid crystal display devices. The protective film of the present invention may be used as an optical protective film also serving as a retardation film.

The optical protective film of the present invention may be either a non-stretched film or a stretched film.

When the optical protective film of the present invention is a non-stretched film, the in-plane retardation may preferably be smaller than 20 nm, more preferably smaller than 10 nm.

When the optical protective film of the present invention is a stretched film, the in-plane retardation may preferably be from 20 to 500 nm, more preferably from 50 to 400 nm.

When the optical protective film of the present invention is a stretched film, the film is able to have the function of a retardation film by allowing it to have a specific retardation (e.g., λ/2 or λ/4). In this case, a (meth)acrylic acid and/or a (meth)acrylic acid ester, which are the monomers represented by the above formula (3) may preferably be used as the monomer used in the production of the lactone ring-containing polymer. Also, an acrylic type polymer may preferably be contained as one other polymer contained in the optical planar thermoplastic resin composition (A).

The optical protective film of the present invention has small wavelength dependency of the retardation, and the ratio (R/Re) of the retardation R at each wavelength to the retardation Re at 590 nm may preferably be from 0.9 to 1.2, more preferably from 0.95 to 1.1.

The optical protective film of the present invention has small incident angle dependency of the retardation. The difference ($R_{40}-R_0$) between the retardation at an incident angle of 0° and the retardation at an incident angle of 40° is smaller than 20 nm, more preferably smaller than 10 nm.

The optical protective film of the present invention has high surface hardness and may preferably have a pencil hardness of H or higher, more preferably 2H or higher.

The process for producing the optical protective film of the present invention is not particularly limited, but the optical protective film of the present invention can be obtained, for example, by mixing a lactone ring-containing polymer and, if necessary, at least one other polymer and an additive(s) by using any of the heretofore known methods, followed by forming the mixture into a film form. The film may also be stretched to form a stretched film.

As the method of forming a film, there may be used any of the heretofore known film formation methods. Examples of the film formation method may include solution casting methods, melt extrusion methods, calendering methods, and compression formation methods. In these film formation methods, solution casting methods and melt extrusion methods may particularly be preferred.

Examples of the solvent to be used in the solution casting method may include chlorine type solvents such as chloroform and dichloromethane; aromatic type solvents such as toluene, xylene, and benzene; alcohol type solvents such as methanol, ethanol, isopropanol, n-butanol, and 2-butanol; methyl cellosolve, ethyl cellosolve, butyl cellosolve, dimethylformamide, dimethylsulfoxide, dioxane, cyclohexanone, tetrahydrofuran, acetone, methyl ethyl ketone, ethyl acetate, and diethyl ether. These solvents may be used alone, or two or more kinds of these solvents may also be used in combination.

Examples of the apparatus used to carry out the solution casting method may include drum type casting machines, band type casting machines, and spin coaters.

Examples of the melt extrusion method may include T-die methods and inflation methods. At this time, the film formation temperature may preferably be from 150° C. to 350° C., more preferably from 200° C. to 300° C.

As the method of carrying out stretching, any of the heretofore known stretching methods may be applied and, for example, uniaxial stretching, sequential biaxial stretching, or simultaneous biaxial stretching may be used.

The stretching may preferably be carried out at a temperature around the glass transition temperature of a polymer as a film raw material. The specific stretching temperature may preferably be from (glass transition temperature−30° C.) to (glass transition temperature+100° C.), more preferably from (glass transition temperature−20° C.) to (glass transition temperature+80° C.). When the stretching temperature is lower than (glass transition temperature−30° C.), sufficient stretching ratio cannot be obtained in some cases. In contrast, if the stretching temperature is higher than (glass transition temperature+100° C.), the resin may be fluidized, which makes it impossible to carry out stable stretching.

The stretching ratio defined by an area ratio may preferably be from 1.1 to 25, more preferably from 1.3 to 10. When the stretching ratio is smaller than 1.1, no improvement in toughness due to stretching may be obtained. In contrast, when the stretching ratio is greater than 25, no effect with an increase in stretching ratio can be observed.

The stretching speed (in one direction) may preferably be from 10%/min. to 20,000%/min., more preferably from 100%/min. to 10,000%/min. If the stretching speed is lower than 10%/min., it may take time to obtain a sufficient stretching ratio, which raises the production cost. In contrast, if the stretching speed is higher than 20,000%/min., the stretched film may be broken, for example.

To stabilize the optical isotropy and mechanical characteristics of the film, heat treatment (annealing) may also be carried out after the stretching treatment.

<Optical Film>

Another preferred embodiment of the optical planar thermoplastic resin composition (A) of the present invention is an optical film (hereinafter referred to sometimes as "the optical film of the present invention").

The optical film of the present invention is not particularly limited, so long as it is a film having excellent optical characteristics. The optical film of the present invention may preferably be a retardation film (hereinafter referred to sometimes as "the retardation film of the present invention") or a view angle compensation film (hereinafter referred to sometimes as "the visual angle compensation film of the present invention").

The optical film of the present invention may have an in-plane retardation of from 20 to 500 nm, more preferably from 50 to 400 nm.

The optical film of the present invention may be either a non-stretched film or stretched film, and it may preferably be a stretched film to exhibit a great retardation.

The retardation film of the present invention has small wavelength dependency of the retardation, and the ratio (R/Re) of the retardation R at each wavelength to the retardation Re at 590 nm may preferably be from 0.9 to 1.2, more preferably from 0.95 to 1.1.

The retardation film of the present invention has small incident angle dependency of the retardation. The difference ($R_{40}-R_0$) between the retardation at an incident angle of 0° and the retardation at an incident angle of 40° is smaller than 20 nm, more preferably smaller than 10 nm.

The retardation film of the present invention has high surface hardness and may preferably have a pencil hardness of H or higher, more preferably 2H or higher.

The process for producing the retardation film of the present invention is not particularly limited, but the retardation film of the present invention can be obtained, for example, by mixing a lactone ring-containing polymer and, if necessary, at least one other polymer and an additive(s) by using any of the heretofore known methods, followed by forming the mixture into a film form. The film may also be stretched into a stretched film.

The film formation temperature and the method of forming a film are the same as those which are used for the above optical protective film.

As the method of carrying out stretching, any of the heretofore known stretching methods may be applied and for example, uniaxial stretching, sequential biaxial stretching, or simultaneous biaxial stretching may be used. In these stretching methods, uniaxial stretching may particularly be preferred to form a retardation film.

The stretching temperature, stretching ratio, and stretching speed are the same as those which are used for the above optical protective film.

To stabilize the optical isotropy and mechanical characteristics of the film, heat treatment (annealing) may also be carried out after the stretching treatment.

The retardation film of the present invention may be subjected, if necessary, to the corona treatment of the surface thereof. Particularly in the case of surface-treating the film by coating processing or the like and in the case of laminating other films by using an adhesive, the corona treatment of the surface of the film may preferably be carried out to improve the adhesion of the both.

The retardation film of the present invention may be laminated on a polarizing plate. The retardation film of the present invention may also be used as the protective film in a polarizing plate.

The view angle compensation film of the present invention has small wavelength dependency of the retardation, and the ratio (R/Re) of the retardation R at each wavelength to the retardation Re at 590 nm may preferably be from 0.9 to 1.2, more preferably from 0.95 to 1.1.

The view angle compensation film of the present invention has high surface hardness and may preferably have a pencil hardness of H or higher, more preferably 2H or higher.

The process for producing the view angle compensation film of the present invention is not particularly limited, but the view angle compensation film of the present invention can be obtained, for example, by mixing a lactone ring-containing polymer and, if necessary, at least one other polymer and an additive(s) by using any of the hereto fore known methods, followed by forming mixture into a film form. The film may also be stretched into a stretched film.

The film formation temperature and the method of forming a film are the same as those which are used for the above optical protective film.

As the method of carrying out stretching, any of the heretofore known stretching methods may be applied and, for example, uniaxial stretching, sequential biaxial stretching, and simultaneous biaxial stretching may be used. In these stretching methods, biaxial stretching such as sequential biaxial stretching or simultaneous biaxial stretching may particularly be preferred to form a view angle compensation film.

The stretching temperature, stretching ratio, and stretching speed are the same as those which are used for the above optical protective film.

To stabilize the optical isotropy and mechanical characteristics of the film, heat treatment (annealing) may also be carried out after the stretching treatment.

<Optical Sheet>

Still another preferred embodiment of the optical planar thermoplastic resin composition (A) of the present invention is an optical sheet (hereinafter referred to sometimes as "the optical sheet of the present invention").

The optical sheet of the present invention is not particularly limited, so long as it is a sheet having excellent heat resistance and excellent optical characteristics. The optical sheet of the present invention may preferably be a diffusing plate (hereinafter referred to sometimes as "the diffusing plate of the present invention") or a light guide plate (hereinafter referred to sometimes as "the light guide plate of the present invention").

When the optical sheet of the present invention is a diffusing plate, it may have the same structure as that of any of the heretofore known diffusing plates, except that the lactone ring-containing polymer of the present invention is contained as a resin component.

When the optical sheet of the present invention is a light guide plate, it may have the same structure as that of any of the heretofore known light guide plates, except that the lactone ring-containing polymer of the present invention is contained as a resin component.

The optical sheet of the present invention may preferably have an in-plane retardation of smaller than 20 nm, more preferably smaller than 10 nm.

The optical sheet of the present invention has high surface hardness and may preferably have a pencil hardness of H or higher, more preferably 2H or higher.

The optical sheet of the present invention has particularly high heat resistance and may preferably have a Vicat softening point of 110° C. or higher, more preferably 120° C. or higher.

The process for producing the optical sheet of the present invention is not particularly limited, but the optical sheet of the present invention can be obtained, for example, by mixing a lactone ring-containing polymer and, if necessary, at least one other polymer and an additive(s) by using any of the heretofore known methods, followed by forming the mixture into a sheet form.

As the sheet formation method, any of the heretofore known sheet formation methods may be applied. Specific examples of the sheet formation method may include extrusion formation, injection molding, inflation formation, and blow formation.

The temperature for the sheet formation may preferably be from 150° C. to 350° C., more preferably from 200° C. to 300° C.

The diffusing plate of the present invention may preferably contain an organic filling agent(s) and/or an inorganic filling agent(s) as an additive(s).

As to the amount of organic filling agent and/or inorganic filling agent to be used, the total amount of organic filling agent and/or inorganic filling agent may preferably be from 0.01% to 50% by mass, more preferably from 0.05% to 40% by mass, and more preferably from 0.1% to 20% by mass, relative to the lactone ring-containing polymer. When the organic filling agent and/or inorganic filling agent are used in an amount falling within the above range, there can be obtained a diffusing plate having well balanced characteristics such as light transmittance, diffusion rate, strength, rigidity, heat deformation temperature, and hardness.

Examples of the organic filling agent may include polymers and polymer cross-linked particles.

When the polymer cross-linked particles are used as the organic filling agent, the particle diameter of the polymer cross-linked particles may preferably be from 0.1 to 100 µm, more preferably from 0.5 to 50 µm.

Examples of the organic filling agent may include acrylic resins, polyurethane, polyvinyl chloride, polystyrene, polyacrylonitrile, polyamide, polysiloxanes, and fluorinated resins. These organic filling agents may be used alone, or two or more kinds of these organic filling agents may also be used in combination.

Examples of the inorganic filling agent may include silica, silica alumina, diatomaceous earth, alumina, calcium carbonate, titanium oxide, magnesium oxide, pumice powder, pumice balloon, aluminum hydroxide, magnesium hydroxide, basic magnesium carbonate, dolomite, calcium sulfate, potassium titanate, barium carbonate, barium sulfate, calcium sulfite, talc, clay, mica, asbestos, glass flake, glass beads, calcium silicate, montmorillonite, pentonite, graphite, aluminum powder, and molybdenum sulfide. These inorganic filling agents may be used alone, or two or more kinds of these inorganic filling agents may also be used in combination. In these inorganic filling agents, calcium carbonate, titanium oxide, alumina, silica, silica alumina, talc, and barium carbonate may particularly be preferred.

The weight average particle diameter of the inorganic filling agent may preferably be from 0.5 to 50 μm, more preferably from 1 to 30 μm. When the weight average particle diameter of the inorganic filling agent is increased within the above range, the total light transmittance of the light diffusing plate obtained may be decreased and the diffusion transmittance may be increased. Therefore, such an optical sheet can preferably be used as a light diffusing plate for displays, grazing materials, blind plates, and illumination instruments. In contrast, when the weight average particle diameter of the inorganic filling agent is decreased within the above range, the total light transmittance of the light diffusing plate obtained may be increased and the diffusion transmittance may be decreased. Therefore, such an optical sheet can preferably be used for applications such as large-scale display screens.

Using the diffusing plate of the present invention, a light diffusing sheet for liquid crystal display devices and a back light unit using this light diffusing sheet may be obtained by any of the heretofore known methods.

The light guide plate of the present invention may preferably be provided with a fine uneven shape having a light reflecting function on one surface except for the side surfaces. Examples of the fine uneven shape may include V-shaped groove shapes and continuous prism shapes.

The light guide plate of the present invention may preferably be provided with an anti-light reflection layer on one surface except for the side surfaces. When the light guide plate of the present invention has a fine uneven shape having a light reflecting function on one surface except for the side surfaces as described above, the anti-light-reflection layer may preferably be disposed on the side opposite to the surface having the fine uneven shape having a light reflecting function.

The anti-light reflection layer is not particularly limited, so long as it is a layer having the function of preventing the reflection of light such as visible rays on the incident plane in the same manner as in the case of the anti-light reflection layers of ordinary optical parts. Examples of the anti-light reflection layer may include inorganic thin films and transparent resin films.

Using the light guide plate of the present invention, a light guide plate for liquid crystal display devices and a back light unit or a front light unit using this light guide plate may be obtained by any of the heretofore known methods.

<<Optical Planar Thermoplastic Resin Composition (B)>>

The optical planar thermoplastic resin composition (B) comprises a lactone ring-containing polymer and at least one other thermoplastic resin, the composition having a glass transition temperature of 120° C. or higher, an in-plane retardation of 20 nm or smaller per a thickness of 100 μm and a total light transmittance of 85% or higher.

As at least one other thermoplastic resin used in the optical planar thermoplastic resin composition (B), the kind thereof is no object, so long as when it is mixed with a lactone ring-containing polymer to form a film, the film can exhibit such performances that the glass transition temperature is 120° C. or higher, the in-plane retardation is 20 nm or smaller per a thickness of 100 μm, and the total light transmittance is 85% or higher. However, a thermoplastic resin which is thermodynamically compatible with a lactone ring-containing polymer may be preferred from the viewpoint of providing an optical film having high performances including transparency, heat resistance, low retardation, and excellent mechanical strength.

The ratio of a lactone ring-containing polymer to at least one other thermoplastic resin in the optical planar thermoplastic resin composition (B) may preferably be from 60% to 99% by mass: from 1% to 40% by mass, more preferably from 70% to 97% by mass: from 3% to 30% by mass, and still more preferably from 80% to 95% by mass: from 5% to 20% by mass. When the content of the lactone ring-containing polymer in the optical planar thermoplastic resin composition (B) is lower than 60% by mass, the effect of the present invention cannot sufficiently be exhibited in some cases.

Examples of the at least one other thermoplastic resin include olefin type polymers such as polyethylene, polypropylene, ethylene/propylene copolymers, and poly(4-methyl-1-pentene); halogen-containing type polymers such as vinyl chloride and chlorinated vinyl resins; styrene type polymers such as polystyrene, styrene/methyl methacrylate copolymers, styrene-acrylonitrile copolymers, and acrylonitrile-butadiene-styrene block copolymers; polyesters such as polyethylene terephthalate, polybutylene terephthalate, and polyethylene naphthalate; polyamides such as nylon 6, nylon 66, and nylon 610; polyacetals; polycarbonates; polyphenylene oxides; polyphenylene sulfides; polyether ether ketones; polysulfones; polyether sulfones; polyoxybenzylenes; polyamideimides; and rubber like polymers such as ABS resins and ASA resins mixed with polybutadiene type rubbers or acrylic type rubbers. The rubber like polymer may preferably be those having a graft part compatible with the lactone ring-containing polymer on the surface thereof. The average particle diameter of the rubber like polymer may preferably be from 100 nm or smaller, more preferably 70 nm or smaller, from the viewpoint of improving the transparency when the optical planar thermoplastic resin composition (B) is formed into a film.

Examples of the thermoplastic resin compatible with the lactone ring-containing polymer may include copolymers having a vinyl cyanate type monomer unit and an aromatic vinyl type monomer unit, and may specifically include acrylonitrile-styrene type copolymers, polyvinyl chloride resins, and polymers containing 50% by mass or greater of methacrylic acid esters. When an acrylonitrile-styrene type copolymer in these thermoplastic resins is used, an optical film having a glass transition temperature of 120° C. or higher, an in-plane retardation of 20 nm or smaller per a thickness of 100 μm, and a total light transmittance of 85% or higher can easily be obtained. In this case, it can be confirmed that the lactone ring-containing polymer is thermodynamically compatible with the at least one other thermoplastic resin by measuring the glass transition temperature of a thermoplastic resin composition obtained by mixing these components. Specifically, it may be said that the lactone ring-containing polymer is compatible with the at least one other thermoplastic resin if the glass transition temperature of a mixture of the lactone ring-containing polymer and the at least one other thermoplastic resin is measured at only one point when measured by a difference scanning calorimeter.

In the case where an acrylonitrile-styrene type copolymer is used as the other thermoplastic resin, there can be used, as the production method thereof, any of the emulsion polymerization methods, the suspension polymerization methods, the solution polymerization methods, the bulk polymerization methods, and the like. However, it is preferred to use any of the solution polymerization methods and bulk polymerization methods from the viewpoint of the transparency and optical performance of the optical planar thermoplastic resin composition (B) obtained.

The optical planar thermoplastic resin composition (B) may contain various additives. Examples of the additives may include antioxidants such as those of the hindered phenol type, those of the phosphorous type, and those of the sulfur type; stabilizers such as right resistant stabilizers, weatherability stabilizers, and thermal stabilizers; reinforcing materials such as glass fibers and carbon fibers; ultraviolet absorbers such as phenyl salicylate, (2,2'-hydroxy-5-methylphenyl)benzotriazole, and 2-hydroxybenzophenone; near-infrared absorbers; flame retardants such as tris(dibromopropyl)phosphate, triaryl phosphate, and antimony oxide; antistatic agents such as surfactants of the anionic type, surfactants of the cationic type, and surfactants of the nonionic type; colorants such as inorganic pigments, organic pigments, and dyes; organic fillers and inorganic fillers; resin modifiers; organic filling agents and inorganic filling agents; plasticizers; lubricants; antistatic agents; and flame retardants.

The content of the additives in the optical planar thermoplastic resin composition (B) may preferably be from 0% to 5% by mass, more preferably from 0% to 2% by mass, and still more preferably from 0% to 0.5% by mass.

The process for producing the optical planar thermoplastic resin composition (B) is not particularly limited, but, for example, the lactone ring-containing polymer and, if necessary, at least one other thermoplastic resin and an additive(s) may be thoroughly mixed using any of the heretofore known methods and then formed into a planar shape. The planar form may preferably be a film form or a sheet form.

<Optical Film>

A preferred embodiment of the optical planar thermoplastic resin composition (B) of the present invention is an optical film (hereinafter referred to sometimes as "the optical film of the present invention").

The optical film of the present invention is an optical film which can sufficiently exhibit the characteristics depending upon various optical applications.

The optical film of the present invention has a glass transition temperature of 120° C. or higher, and may preferably have a glass transition temperature of 125° C. or higher, more preferably 130° C. or higher.

The optical film of the present invention may preferably have an in-plane retardation of 20 nm or smaller, more preferably 10 nm or smaller, per a thickness of 100 µm.

The optical film of the present invention may preferably have a total light transmittance of 85% or higher, more preferably 87% or higher, and still more preferably 90% or higher.

The optical film of the present invention has small incident angle dependency of the retardation. The difference ($R_{40}-R_0$) between the retardation per a thickness of 100 µm at an incident angle of 0° and the retardation per a thickness of 100 µm at an incident angle of 40° may preferably be 20 nm or smaller, more preferably 10 nm or smaller.

The optical film of the present invention may preferably have a thickness of not smaller than 1 µm and smaller than 500 µm, more preferably not smaller than 10 µm and smaller than 300 µm. When the thickness is smaller than 1 µm, sufficient mechanical strength cannot be exhibited in some cases, and therefore, the film may easily be broken when stretched.

The tensile strength of the optical film of the present invention when measured according to ASTM-D-882-61T may preferably be not lower than 10 MPa and lower than 100 MPa, more preferably not lower than 30 MPa and lower than 100 MPa. When the tensile strength is lower than 10 MPa, sufficient mechanical strength cannot be exhibited in some cases. In contrast, when the tensile strength is higher 100 MPa, processability may be deteriorated.

The rate of elongation of the optical film of the present invention when measured according to ASTM-D-882-61T may preferably be 1% or greater, more preferably 3% or greater. The upper limit of the rate of elongation may preferably be 100% or smaller in usual cases, although it is not particularly limited. When the rate of elongation is smaller than 1%, toughness may be deteriorated.

The tensile modulus of the optical film of the present invention when measured according to ASTM-D-882-61T may preferably be 0.5 GPa or greater, more preferably 1 GPa or greater, and more preferably 2 GPa or greater. The upper limit of the tensile modulus may preferably be 20 GPa or smaller in usual cases, although it is not particularly limited. When the tensile modulus is smaller than 0.5 GPa, sufficient mechanical strength cannot be exhibited in some cases.

The process for producing the optical film of the present invention is not particularly limited, but the optical film of the present invention can be obtained, for example, by mixing a lactone ring-containing polymer and at least one other thermoplastic resin and, if necessary, an additive(s) by using any of the heretofore known methods to prepare a thermoplastic resin composition in advance, which is then formed into a film. As the method of producing the thermoplastic resin composition, there may be employed a method in which the above components are pre-blended by using a mixer such as an omni-mixer and then the mixture obtained is extrusion-kneaded. In this case, the kneader used for the extrusion kneading is not particularly limited, but any of the heretofore known kneaders, for example, extruders such as single screw extruders and twin-screw extruders, and pressure kneaders.

As the method of forming a film, there may be used any of the heretofore known film formation methods. Examples of the film formation method may include solution casting methods, melt extrusion methods, calendering methods, and compression formation methods. In these film formation methods, solution casting methods and melt extrusion methods may particularly be preferred. In this case, the thermoplastic resin composition which has been extruded and kneaded in advance as described above may be used. Alternatively, the lactone ring-containing polymer, at least one other thermoplastic resin and, if necessary, an additive(s), may separately be dissolved in solvents to form solutions, which are then mixed in a uniform solution, and this uniform solution may be subjected to a film formation step using a solution casting method or a solution extrusion method.

Examples of the solvent to be used in the solution casting method may include chlorine type solvents such as chloroform and dichloromethane; aromatic type solvents such as toluene, xylene, and benzene; alcohol type solvents such as methanol, ethanol, isopropanol, n-butanol, and 2-butanol; methyl cellosolve, ethyl cellosolve, butyl cellosolve, dimethylformamide, dimethylsulfoxide, dioxane, cyclohexanone, tetrahydrofuran, acetone, methyl ethyl ketone, ethyl acetate, and diethyl ether. These solvents may be used alone, or two or more kinds of these solvents may also be used in combination.

Examples of the apparatus used to carry out the solution casting method may include drum type casting machines, band type casting machines, and spin coaters.

Examples of the melt extrusion method may include T-die methods and inflation methods. At this time, the film formation temperature may preferably be from 150° C. to 350° C., more preferably from 200° C. to 300° C.

When the film is formed by a T-die method, a T-die is set to the top end of a known single screw extruder or twin-screw extruder, and a film extruded in a film form may be rolled to obtain a rolled film. At this time, it is possible to carry out a uniaxial stretching step by appropriately controlling the temperature of wind-up rolls to stretch the film in the direction of extrusion. It is also possible to add a step such as sequential biaxial stretching or simultaneous biaxial stretching by adding a step of stretching the film in a direction perpendicular to the direction of extrusion.

The optical film of the present invention may be either a non-stretched film or a stretched film. When the optical film of the present invention is stretched, it is either a uniaxial stretched film or a biaxial stretched film. When the optical film of the present invention is a biaxial stretched film, it may be either one obtained by simultaneous biaxial stretching or one obtained by sequential biaxial stretching. When biaxially stretched, the film has improved mechanical strength, leading to an improvement in the performance of the film. When at least one other thermoplastic resin is mixed in the optical film of the present invention, an increase in the retardation of the film can be suppressed and the optical isotropy of the film can be retained, even if the film is stretched.

The stretching may preferably be carried out at a temperature around the glass transition temperature of a polymer as a film raw material. The specific stretching temperature may preferably be from (glass transition temperature−30° C.) to (glass transition temperature+100° C.), more preferably from (glass transition temperature−20° C.) to (glass transition temperature+80° C.). When the stretching temperature is lower than (glass transition temperature−30° C.), sufficient stretching ratio cannot be obtained in some cases. In contrast, when the stretching temperature is higher than (glass transition temperature+100° C.), the resin may be fluidized, which makes it impossible to carry out inhibits stable stretching.

The stretching ratio defined by an area ratio may preferably be from 1.1 to 25, more preferably from 1.3 to 10. When the stretching ratio is smaller than 1.1, no improvement in toughness due to stretching may be obtained. In contrast, when the stretching ratio is greater than 25, no effect with an increase in stretching ratio can be observed.

The stretching speed (in one direction) may preferably be from 10%/min. to 20,000%/min., more preferably from 100%/min. to 10,000%/min. If the stretching speed is lower than 10%/min., it may take time to obtain a sufficient stretching ratio, which raises the production cost. In contrast, if the stretching speed is higher than 20,000%/min., the stretched film may be broken, for example.

To stabilize the optical isotropy and mechanical characteristics of the film, heat treatment (annealing) may also be carried out after the stretching treatment.

EXAMPLES

The present invention will be described below in more detail by way of Examples, but the present invention is not limited to the following Examples. The present invention can be put into practice after appropriate modifications or variations within a range meeting the gists described above and later, all of which are included in the technical scope of the present invention. In the following Examples, "parts by mass" and "liter" are described simply as "parts" and "L", respectively, for the sake of convenience.

Production Examples 1 to 4, Examples 1 to 19, and Comparative Example 1 to 2 each correspond to the optical planar thermoplastic resin composition (A) of the present invention, and Production Examples 5 and 6, Examples 20 to 22, and Comparative Example 3 each correspond to the optical planar thermoplastic resin composition (B) of the present invention.

<Polymerization Reaction Rate and Polymer Composition Analysis>

The reaction rate in the polymerization reaction and the contents of specific monomer units in a polymer were determined by measuring the amounts of unreacted monomers in the resulting polymerization reaction mixture using gas chromatography (GC17A, available from Shimadzu Corporation).

<Dynamic TG>

The polymer (or a polymer solution or polymer pellets) was once dissolved in or diluted with tetrahydrofuran, which was then poured into excess hexane or methanol to cause reprecipitation. The precipitate taken out from the solution was dried under vacuum (1 mmHg (1.33 hPa), 80° C., 3 hours or longer) to remove volatile components. The resulting resin having a white solid form was analyzed by the following method (dynamic TG method).

Measuring apparatus: Differential type differential thermobalance (Thermo Plus 2 TG-8120 Dynamic TG, available from Rigaku Corporation)

Measuring condition: Sample amount: from 5 to 10 mg
Temperature rise rate: 10° C./min.
Atmosphere: Nitrogen flow, 200 mL/min.
Method: Stepped isothermal control method (weight loss rate within a temperature range of from 60° C. to 500° C. was controlled to 0.005%/s or smaller)

<Content of Lactone Ring Structure>

First, the weight loss when all hydroxyl groups were removed as methanol from the resulting polymer composition by dealcoholization was defined as the standard, and then, a dealcoholization reaction rate was determined from the weight loss in the dealcoholization reaction within a temperature range of from 150° C. before the start of weight loss to 300° C. before the start of the decomposition of the polymer in the dynamic TG measurement.

More specifically, a weight loss rate within a temperature range of from 150° C. to 300° C. is measured in the dynamic TG measurement of the polymer having a lactone ring structure, and the measured actual value is defined as an actual weight loss rate (X). On the other hand, the weight loss rate is calculated from the composition of the polymer on the premise that all hydroxyl groups contained in the polymer composition are converted into alcohols to participate in the formation of lactone rings and then dealcoholized (specifically, the weight loss rate calculated on the premise that 100% of the alcohols in the composition undergoes dealcoholization reaction) is defined as a theoretical weight loss rate (Y). The theoretical weight loss rate (Y) may be calculated more specifically from the molar ratio of the raw material monomer having a structure (i.e., hydroxyl groups) participating in the dealcoholization reaction in the polymer, that is, from the content of the raw material monomer in the polymer composition. In the following equation of dealcoholization, the above values are substituted to calculate and the obtained value is noted by percentage, thereby obtaining the rate of dealcoholization reaction.

$$1 - (\text{Actual weight loss rate}(X)/\text{Theoretical weight loss rate}(Y))$$

Then, on the assumption that lactone cyclization may occur corresponding to this rate of dealcoholization reaction, the content of the raw monomer having the structure (i.e., hydroxyl groups) participating in the lactone cyclization is multiplied by the rate of dealcoholization reaction, whereby the proportion occupied by the lactone ring structure in the polymer can be calculated.

As one example, there will be calculated the proportion of the lactone ring structure in the pellets obtained in Production Example 1 explained later. To determine the theoretical weight loss rate (Y), the content of methyl 2-(hydroxymethyl) acrylate in the polymer is as follows: $(32/116) \times 25.0 \approx 6.90\%$ by mass since the molecular weight of methanol is 32, the molecular weight of methyl 2-(hydroxymethyl)acrylate is 116, and the content (by mass ratio) of methyl 2-(hydroxymethyl)acrylate is 25.0% by mass from the composition. On the other hand, the actual weight loss rate (X) determined by dynamic TG measurement was 0.22% by mass. Substituting these values in the above dealcoholization equation, $1-(0.22/6.90)=0.968$, and thus, the dealcoholization reaction rate is 96.8%. Then, on the assumption that lactone cyclization may occur corresponding to this rate of dealcoholization reaction in the polymer, the content (25.0% by mass) of methyl 2-(hydroxymethyl)acrylate is multiplied by the dealcoholization reaction rate (96.8%=0.968), to find that the proportion of the lactone ring in the polymer is 24.2% ($=25.0\% \times 0.968$) by mass.

Also, there will be calculated the proportion of the lactone ring structure in the pellets obtained in Production Example 5 explained later. To determine the theoretical weight loss rate (Y), the content of methyl 2-(hydroxymethyl)acrylate in the polymer is as follows: $(32/116) \times 20.0=5.52\%$ by mass since the molecular weight of methanol is 32, the molecular weight of methyl 2-(hydroxymethyl)acrylate is 116, and the content (by mass ratio) of methyl 2-(hydroxymethyl)acrylate is 20.0% by mass from the composition. On the other hand, the actual weight loss rate (X) determined by dynamic TG measurement was 0.17% by mass. Substituting these values in the above dealcoholization equation, $1-(0.17/5.52)=0.969$, and thus, the dealcoholization reaction rate is 96.9%. Then, on the assumption that lactone cyclization may occur corresponding to this rate of dealcoholization reaction in the polymer, the content (20.0% by mass) of methyl 2-(hydroxymethyl)acrylate is multiplied by the dealcoholization reaction rate (96.9%=0.969), to find that the proportion of the lactone ring in the polymer is 19.4% ($=20.0\% \times 0.969$) by mass.

<Weight Average Molecular Weight>

The weight average molecular weight of a polymer was determined in terms of polystyrene using gel permeation chromatography (GPC System, available from Tosoh Corporation).

<Melt Flow Rate>

The melt flow rate was measured at a test temperature of 240° C. under a load of 10 kg according to JIS-K6874.

<Thermal Analysis of Polymer>

The thermal analysis of a polymer was made using a differential scanning calorimeter (DSC-8230, available from Rigaku Corporation) on the following conditions: sample amount, 10 mg; temperature rise rate, 10° C./min.; and nitrogen flow, 50 mL/min. The glass transition temperature (Tg) was determined by a middle point method according to ASTM-D-3418.

<Surface Hardness>

The surface hardness of a film was measured as pencil hardness using a pencil scratch tester according to JIS K-5400.

<Optical Characteristics>

As to the refractive index anisotropy (retardation: Re), the retardation was measured using a retardation measuring apparatus (KOBRA-21ADH, available from Oji Scientific Instruments). The total light transmittance and haze were measured using a hazemeter (NDH-1001DP, available from Nippon Denshoku Industries Co., Ltd.). The refractive index and Abbe number were measured using an Abbe refractometer (DR-M2, available from Atago Co., Ltd.) by using 1-bromonaphthalene as a contact liquid.

<Mechanical Characteristics>

The tensile strength, rate of elongation, and tensile modulus were measured based on ASTM-D-882-61T.

Then, Production Examples of lactone ring-containing polymers will be explained.

Production Example 1

A 30 L vessel type reactor equipped with a stirrer, a temperature sensor, a condenser tube, and a nitrogen introduction pipe was charged with 9,000 g of methylmethacrylate (MMA), 1,000 g of methyl 2-(hydroxymethyl)acrylate (MHMA), 10,000 g of 4-methyl-2-pentanone (i.e., methyl isobutyl ketone, MIBK), and 5 g of n-dodecylmercaptane. The mixture was heated to 105° C. under a nitrogen stream to cause reflux, at which 5.0 g of t-butylperoxyisopropyl carbonate (KAYACARBON BIC-75, available from Kayaku Akzo Co., Ltd.) was added as a polymerization initiator, and at the same time, solution polymerization was carried out under reflux at from about 105° C. to 120° C., while a solution containing 10.0 g of t-butylperoxyisopropyl carbonate and 230 g of MIBK was added dropwise over 4 hours. The reaction mixture was then aged over further 4 hours.

Then, 30 g of a mixture of stearyl phosphate and distearyl phosphate (Phoslex A-18, available from Sakai Chemical Industry Co., Ltd.) was added to the polymer solution obtained, which was allowed to cause cyclization condensation reaction under reflux at from about 90° C. to 120° C. for 5 hours. Then, the polymer solution obtained was introduced at a treatment rate of 2.0 kg/h on the resin basis into a vent type twin-screw extruder ($\phi=29.75$ mm, L/D=30) on the following conditions: barrel temperature, 260° C.; revolution number, 100 rpm; degree of vacuum, from 13.3 to 400 hPa (from 10 to 300 mmHg); the number of rear vents, 1; and the number of fore vents, 4. In this extruder, the polymer solution was further allowed to cause cyclization condensation reaction and devolatilization, and then extruded to obtain transparent pellets of a lactone ring-containing polymer.

The lactone ring-containing polymer obtained was subjected to the measurement of dynamic TG, and as a result, a weight loss of 0.35% by mass was detected. Also, the lactone ring-containing polymer had a weight average molecular weight of 156,000, a melt flow rate of 3.9 g/10 min., and a glass transition temperature of 123° C.

Production Example 2

A 30 L vessel type reactor equipped with a stirrer, a temperature sensor, a condenser tube, and a nitrogen introduction pipe was charged with 8,500 g of MMA, 1,500 g of MHMA, 10,000 g of MIBK, and 5 g of n-dodecylmercaptane. The mixture was heated to 105° C. under a nitrogen stream to cause reflux, at which 10.0 g of t-butylperoxyisopropyl carbonate was added as a polymerization initiator, and at the same time, solution polymerization was carried out under reflux at from about 105° C. to 120° C., while a solution containing 10.0 g of t-butylperoxyisopropyl carbonate and 230 g of MIBK was added dropwise over 4 hours. The reaction mixture was then aged over further 4 hours.

Then, 600 g of acetic acid was added to the polymer solution obtained, which was allowed to cause cyclization condensation reaction at from about 90° C. to 120° C. for 5 hours. Then, the polymer solution obtained was allowed to cause cyclization condensation reaction and devolatilization in a vent type twin-screw extruder in the same manner as described in Production Example 1, and then extruded to obtain transparent pellets of a lactone ring-containing polymer.

The lactone ring-containing polymer obtained was subjected to the measurement of dynamic TG, and as a result, a weight loss of 0.35% by mass was detected. Also, the lactone ring-containing polymer had a weight average molecular weight of 166,000, a melt flow rate of 3.9 g/10 min., and a glass transition temperature of 127° C.

Production Example 3

The reaction was carried out in the same manner as described in Production Example 1, except that the amounts of MMA and MHMA in Production Example 1 were changed to 8,000 g and 2,000 g, respectively, to obtain transparent pellets of a lactone ring-containing polymer.

The lactone ring-containing polymer obtained was subjected to the measurement of dynamic TG, and as a result, a weight loss of 0.64% by mass was detected. Also, the lactone ring-containing polymer had a weight average molecular weight of 144,000, a melt flow rate of 9.2 g/10 min., and a glass transition temperature of 131° C.

Production Example 4

A 30 L vessel type reactor equipped with a stirrer, a temperature sensor, a condenser tube, and a nitrogen introduction pipe was charged with 7,500 g of MMA, 2,000 g of MHMA, 500 g of methacrylic acid, 10,000 g of MIBK, and 25 g of n-dodecylmercaptane. The mixture was heated to 105° C. under a nitrogen stream to cause reflux, at which 10.0 g of t-butylperoxyisopropyl carbonate was added as a polymerization initiator, and at the same time, solution polymerization was carried out under reflux at from about 105° C. to 120° C., while a solution containing 10.0 g of t-butylperoxyisopropyl carbonate and 230 g of MIBK was added dropwise over 4 hours. The reaction mixture was then aged over further 4 hours.

A part of the polymer solution obtained was taken out and subjected to the measurement of dynamic TG, and as a result, a weight loss of 0.59% by mass was detected.

The polymer solution obtained was allowed to cause cyclization condensation reaction and devolatilization in a vent type twin-screw extruder in the same manner as described in Production Example 1, and then extruded to obtain transparent pellets of a lactone ring-containing polymer.

The lactone ring-containing polymer obtained was subjected to the measurement of dynamic TG, and as a result, a weight loss of 0.28% by mass was detected. Also, the lactone ring-containing polymer had a weight average molecular weight of 186,000, a melt flow rate of 7.2 g/10 min., and a glass transition temperature of 139° C.

Production Example 5

A 30 L vessel type reactor equipped with a stirrer, a temperature sensor, a condenser tube, and a nitrogen introduction pipe was charged with 8,000 g of MMA, 2,000 g of MHMA, 10,000 g of MIBK, and 5 g of n-dodecylmercaptane. The mixture was heated to 105° C. under a nitrogen stream to cause reflux, at which 5.0 g of t-butylperoxyisopropyl carbonate was added as a polymerization initiator, and at the same time, solution polymerization was carried out under reflux at from about 100° C. to 120° C., while a solution containing 10.0 g of t-butylperoxyisopropyl carbonate and 230 g of MIBK was added dropwise over 2 hours. The reaction mixture was then aged over further 4 hours.

Then, 30 g of a mixture of stearyl phosphate and distearyl phosphate was added to the polymer solution obtained, which was then allowed to cause cyclization condensation reaction under reflux at from about 90° C. to 120° C. for 5 hours. Then, the polymer solution obtained was allowed to cause cyclization condensation reaction and devolatilization in a vent type twin-screw extruder in the same manner as described in Production Example 1, and then extruded to obtain transparent pellets of a lactone ring-containing polymer.

The lactone ring-containing polymer obtained was subjected to the measurement of dynamic TG, and as a result, a weight loss of 0.17% by mass was detected. Also, the lactone ring-containing polymer had a weight average molecular weight of 133,000, a melt flow rate of 6.5 g/10 min., and a glass transition temperature of 131° C.

Production Example 6

A 30 L vessel type reactor equipped with a stirrer, a temperature sensor, a condenser tube, and a nitrogen introduction pipe was charged with 8,000 g of MMA, 2,000 g of MHMA, 10,000 g of toluene, and 5 g of tris-(2,4-di-t-butylphenyl) phosphite (Adecastab 2112, available from Asahi Denka Industries Co., Ltd.). The mixture was heated to 100° C. under a nitrogen stream to cause reflux, at which 11 g of t-amylperoxyisonanoate (Luperox 570, available from Arkema Yoshitomi, Ltd.) was added as a polymerization initiator, and at the same time, solution polymerization was carried out under reflux at from about 100° C. to 120° C., while a solution containing 22 g of t-amylperoxyisonanoate and 219 g of toluene was added dropwise over 2 hours. The reaction mixture was then aged over further 4 hours.

Then, 10 g of a mixture of stearyl phosphate and distearyl phosphate was added to the polymer solution obtained, which was allowed to cause cyclization condensation reaction under reflux at from about 85° C. to 120° C. for 5 hours. Then, the polymer solution obtained was allowed to cause cyclization condensation reaction and devolatilization in a vent type twin-screw extruder in the same manner as described in Production Example 1, and then extruded to obtain transparent pellets of a lactone ring-containing polymer.

The lactone ring-containing polymer obtained was subjected to the measurement of dynamic TG, and as a result, a weight loss of 0.11% by mass was detected. Also, the lactone ring-containing polymer had a weight average molecular weight of 146,000, a melt flow rate of 11.3 g/10 min., and a glass transition temperature of 130° C.

Example 1

The pellets obtained in Production Example 1 were melt-extruded from a coat hanger type T-die having a width of 150 mm by using a twin-screw extruder having a 20 mmφ screw to obtain a film having a thickness of about 100 μm.

The film obtained was evaluated for optical characteristics and mechanical characteristics. The results are shown in Tables 1 and 2.

Examples 2 to 4

Using each of the pellets obtained in Production Examples 2 to 4, films each having a thickness of about 100 μm were obtained in the same manner as described in Example 1.

The films obtained were evaluated for optical characteristics and mechanical characteristics. The results are shown in Tables 1 and 2.

Comparative Example 1

Using a polycarbonate (Panlight L-1225Y, available from Teijin Chemicals Ltd.), a film having a thickness of about 100 μm was obtained in the same manner as described in Example 1.

The film obtained was evaluated for optical characteristics and mechanical characteristics. The results are shown in Tables 1 and 2.

TABLE 1

| | Thickness (μm) | Total light transmittance (%) | Haze (%) | Refractive Index | Abbe number | Retardation (nm) | $(R_{40}\text{-}R_0)$ (nm) |
|---|---|---|---|---|---|---|---|
| Ex. 1 | 101 | 93 | 0.1 | 1.497 | 63 | 1 | 0.5 |
| Ex. 2 | 98 | 92 | 0.1 | 1.500 | 62 | 2 | 0.8 |
| Ex. 3 | 104 | 92 | 0.3 | 1.502 | 61 | 7 | 1.5 |
| Ex. 4 | 102 | 91 | 0.3 | 1.505 | 61 | 10 | 2.3 |
| Comp. Ex. 1 | 99 | 90 | 0.2 | 1.585 | 30 | 20 | 5 |

TABLE 2

| | Tensile Strength (MPa) | Rate of elongation (%) | Tensile modulus (GPa) | Surface hardness |
|---|---|---|---|---|
| Ex. 1 | 73.0 | 6.2 | 3.2 | 3H |
| Ex. 2 | 74.8 | 5.8 | 3.3 | 3H |
| Ex. 3 | 77.4 | 5.4 | 3.9 | 4H |
| Ex. 4 | 75.0 | 4.8 | 4.1 | 3H |
| Comp. Ex. 1 | 61.5 | 108 | 2.4 | B |
| Ex. 6 | 80.6 | 5.4 | 8 | 3H |

As can be seen from Tables 1 and 2, the films obtained in Examples 1 to 4 had high transparency, low refractive index, low light dispersing ability, high optical isotropy, high tensile strength, high tensile modulus, high surface hardness, and low rate of elongation because these films were formed of the lactone ring-containing polymers.

On the other hand, the film obtained in Comparative Example 1 had high transparency, but had high refractive index, high light dispersing ability, low optical isotropy, low tensile strength, tensile modulus, surface hardness, and high rate of elongation because this film was formed of polycarbonate.

Thus, it is understood that the optical planar thermoplastic resin composition (A) containing a lactone ring-containing polymer as a main component thereof has, in addition to high transparency and high heat resistance, excellent optical characteristics and excellent mechanical characteristics, and it can, therefore, sufficiently exhibit the characteristics according to various optical applications.

Example 5

The film obtained in Example 1 was applied to both surfaces of a polarizer made of polyvinyl alcohol to obtain polarizing plates. These polarizing plates were overlapped in a cross nicol position and observed for the passage of light, and as a result, the passage of light (i.e., bright points) at the overlapped part was not observed.

FIG. 1 shows a schematic view of the polarizing plate obtained. In FIG. 1, "1" designates a polarizer, and "2" and "3" each designates a protective film.

Example 6

The film obtained in Example 1 was biaxially stretched 1.5 times at 150° C. at a stretching speed of 0.1 m/min. by using a biaxial stretching tester (available from Toyo Seiki Seisakusho, Ltd.) to obtain a stretched film having a thickness of 45 μm.

The stretched film obtained was evaluated for mechanical characteristics. The results are shown in Table 2.

The stretched film was applied to both surfaces of a polarizing plate made of polyvinyl alcohol to obtain polarizing plates. These polarizing plates were overlapped in a cross nicol position and observed for the passage of light, and as a result, the passage of light (i.e., bright points) at the overlapped part was not observed.

Example 7

Using the pellets of the lactone ring-containing polymer obtained in Production Example 3, a film having a thickness of about 200 μm was produced in the same manner as in Example 1. The film obtained was uniaxially stretched 1.5 times at 150° C. at a stretching speed of 0.1 m/min. by using a biaxial stretching tester (available from Toyo Seiki Seisakusho, Ltd.) to obtain a stretched film having a thickness of 148 μm.

The in-plane retardations of this stretched film at wavelengths of 450 nm and 590 nm were measured and found to be 95 nm and 93 nm, respectively.

Comparative Example 2

Using a polycarbonate (Panlight L-1225Y, available from Teijin Chemicals Ltd.) as a raw material, a stretched film having a thickness of about 150 nm was obtained by biaxially stretching 1.5 times at 150° C. at a stretching speed of 0.1 m/min by using a biaxial stretching tester (available from Toyo Seiki Seisaku-sho, Ltd.) in the same manner as described in Example 7.

The in-plane retardations of this stretched film at wavelengths of 450 nm and 590 nm were measured and found to be 420 nm and 375 nm, respectively.

Example 8

The stretched film obtained in Example 6 was applied to one surface of a polarizer made of polyvinyl alcohol, and the stretched film obtained in Example 7 was applied to the other surface of the polarizer to obtain a polarizing plate. This polarizing plate and the polarizing plate obtained in Example 6 were overlapped in a cross nicol position and observed for the passage of light, and as a result, the passing of light (i.e., bright points) at the overlapped part was not observed.

Example 9

Using the pellets of the lactone ring-containing polymer obtained in Production Example 3, a film having a thickness of about 200 μm was produced in the same manner as described in Example 1. The film obtained was uniaxially stretched 2.0 times at 140° C. at a stretching speed of 0.1 m/min. by using a biaxial stretching tester (available from Toyo Seiki Seisaku-sho, Ltd.) to obtain a stretched film having a thickness of 126 μm. The in-plane retardation of this stretched film at a wavelength of 590 nm was measured and found to be 146 nm.

The film obtained in Comparative Example 1 was uniaxially stretched 1.3 times at 140° C. at a stretching speed of 0.1 m/min by using a biaxial stretching tester (available from Toyo Seiki Seisaku-sho, Ltd.) to obtain a stretched film having a thickness of 85 μm. The in-plane retardation of this stretched film at a wavelength of 590 nm was measured and found to be 297 nm.

Both of the stretched films obtained were applied to each other such that the optical axes of these two films cross at an angle of 45° to obtain a visual angle compensation film.

Example 10

First, 8 g of dipentaerythritol hexaethylacrylate, 2 g of pentaerythritol triethylacrylate, and 0.5 g of photoinitiator (Irgacure 907, available from Nihon Ciba-Geigy K.K.) were dissolved in 40 g of xylene to prepare a ultraviolet-curable hard coat resin, which was then applied to the stretched film obtained in Example 6 by using a bar coater. After a solvent was removed by drying, ultraviolet rays were applied from a high pressure mercury lamp to the resin to form a hard coat layer having a thickness of 5 μm. An antireflection agent (Cytop, available from Asahi Glass Co., Ltd.) was applied to the hard coat layer to form a low-refractive index layer having a thickness of 0.1 μm, thereby obtaining an antireflection film.

The reflectance of the antireflection film obtained was 0.80% at a wavelength of 550 nm.

Example 11

To one surface of the film obtained in Example 1, a ultraviolet shielding layer having the following composition was applied in a dry thickness of 3 μm and dried at 120° C. for 1 minute. An adhesive layer having the following composition was applied to the surface of the film on the side opposite to the ultraviolet shielding layer such that the dry thickness was 20 μm and dried at 120° C. for 1 minute. The surface hardness of the laminate obtained was 4H. Also, the transmittance of the film at a wavelength of 350 nm was 0%. The transmittance was measured by a spectrophotometer (UV-3100, Shimadzu Corporation).
<Composition of Ultraviolet Shielding Layer>
Ultraviolet shielding acrylic resin (HALSHYBRID UV-G13, available from Nippon Shokubai Co., Ltd.): 100 parts
Isocyanate curing agent (Desmodule N3200, available from Sumika Bayer Urethane Co., Ltd.): 3 parts
Butyl acetate: 37 parts
<Composition of Adhesive Layer>
Copolymer of n-butylacrylate, acrylic acid, and 2-hydroxyethylmethacrylate at a ratio of 93:6:1 (weight average molecular weight (Mw), 800,000; glass transition temperature, about −48° C.; ethyl acetate solution; nonvolatile content, about 40%): 100 parts
Isocyanate curing agent (Coronate L, available from Nippon Polyurethane Industry Co., Ltd.): 1 part
Butyl acetate: 100 parts Example 12

To one surface of the film obtained in Example 1, a heat ray shielding layer having the following composition was applied in a dry thickness of 10 μm and dried at 120° C. for 3 minutes. The surface hardness of the laminate obtained was 5H. Also, the transmittance of the film at a wavelength of 871 nm was 34%, and the transmittance of the film at a wavelength of 1090 nm was 30%. The transmittance was measured by a spectrophotometer (UV-3100, available from Shimadzu Corporation).
<Composition of Heat Ray Shielding Layer>
Acrylic binder (HALSHYBRID IR-G205, available from Nippon Shokubai Co., Ltd.): 100 parts
Phthalocyanine dye (EXCOLOR IR-12, available from Nippon Shokubai Co., Ltd.): 0.3 parts
Diimonium type dye (IRG-022, available from Nippon Kayaku Co., Ltd.): 0.3 parts
Methyl isobutyl ketone: 50 parts Example 13

To one surface of the film obtained in Example 1, a hard coat layer having the following composition was applied in a dry thickness of 3 μm and dried at 130° C. for 2 minutes. The humidity of the laminate obtained was conditioned at 25° C. under a humidity of 60% RH for 2 hours. Then, the coated surface was rubbed under a load of 250 g/cm$^2$ by using steal wool (Model Number: #0000). However, no scratch was observed.
<Composition of Hard Coat Layer>
Heat curable type silicon hard coat agent (SOLGUARD NP730, available from Nippon Dacro Shamlock Co., Ltd.): 100 parts
Isopropyl alcohol: 100 parts Example 14

To one surface of the film obtained in Example 1, a hard coat layer and a low-refractive index layer each having the following composition were laminated in this order. Specifically, the following hard coat agent was applied and dried at 100° C. for 1 minute. Then, the coating layer was cured by irradiating the coating layer with ultraviolet rays from a high-pressure mercury lamp at an intensity of 200 mJ/cm$^2$ to form a hard coat layer having a thickness of 5 μm. Then, a low-refractive index coating agent having the following composition was applied to the surface of the hard coat layer and cured at 100° C. for one hour to form a low-refractive index layer having a thickness of 0.1 μm. The reflectance of the film obtained was 0.25% at a wavelength of 550 nm. The bending property, wet heat resistance, heat resistance, and reflectance of the obtained film were evaluated. The results are shown in Table 3.
<Preparation of Hard Coat Agent>
First, 8 g of dipentaerythritol hexaacrylate (Light Acrylate DPE-6A, available form Kyoeisha Chemical Co., Ltd.) and 2 g of pentaerythritol triacrylate (Light Acrylate PE-3A, available from Kyoeisha Chemical Co., Ltd.) were mixed and dissolved in 40 g of methyl ethyl ketone to prepare a solution, to which was added a solution prepared by dissolving 0.5 g of a photoinitiator (Irgacure 907, available from Ciba Specialty Chemicals K.K.) in 2 g of methyl isobutyl ketone to prepare a hard coat agent.

<Preparation of Low-Refractive Index Coating Agent>

A 300 mL four-neck flask equipped with a stirrer, a thermometer, and a condenser tube was charged with 144.5 g of tetramethoxysilane, 23.6 g of γ-methacryloxypropyltrimethoxysilane, 19.0 g of water, 30.0 g of methanol, and 5.0 g of Amberlist 15 (cation exchange resin available from Organo Corporation), and the mixture was stirred at 65° C. for 2 hours to cause reaction. The reaction mixture was cooled to room temperature. Then, in place of the condenser tube, the flask was provided with a distillation tower, a condenser tube connected with the distillation tower, and a discharge outlet. The temperature of the mixture in the flask was raised to about 80° C. under normal pressure over 2 hours, and the mixture was kept at the same temperature until no methanol was distilled out. Then, the mixture was kept at 90° C. under a pressure of 2.67×10 kPa until no methanol was distilled out to allow the reaction to further proceed. The reaction mixture was cooled again to room temperature, and then, Amberlist 15 was removed by filtration to obtain a polymerizable polysiloxane having a number average molecular weight of 1,800.

Then, a 1 L flask equipped with a stirrer, a dropping port, a thermometer, a condenser tube, and a nitrogen introduction port was charged with 260 g of n-butyl acetate as an organic solvent. Nitrogen gas was introduced into the flask, and the content of the flask was heated to 110° C. with stirring. Then, a solution obtained by mixing 12 g of the polymerizable polysiloxane obtained above, 19 g of t-butyl methacrylate, 94 g of butyl acrylate, 67 g of 2-hydroxyethyl methacrylate, 48 g of perfluorooctyl ethylmethacrylate (Light Ester FM-108, available from Kyoeisha Chemical Co., Ltd.), and 2.5 g of 2,2'-azobis(2-methylbutyronitrile) was added dropwise from the dropping port. After the dropwise addition, the mixture was also stirred at the same temperature for one hour, and then, 0.1 g of t-butylperoxy-2-ethylhexanoate was added twice at intervals of 30 minutes. The mixture was further heated for 2 hours to cause copolymerization, thereby obtaining a solution containing an organic polymer having a number average molecular weight of 12,000 and a weight average molecular weight of 27,000 dissolved in n-butyl acetate. The solid content of the solution obtained was 48.2%.

Then, a 500 mL four-neck flask provided with a stirrer, two dropping ports ("a" and "b"), and a thermometer was charged with 200 g of n-butyl acetate and 50 g of methanol, and the internal temperature was adjusted to 40° C. Then, a mixture solution (raw material solution (A)) containing 10 g of the n-butyl acetate solution of the organic polymer obtained above, 30 g of tetramethoxysilane, and 5 g of n-butyl acetate was added dropwise from the dropping port "a", and a mixture solution (raw material solution (B)) containing 5 g of aqueous 25% ammonia, 10 g of deionized water, and 15 g of methanol was added dropwise from the dropping port "b" over 2 hours. After the dropwise addition, in place of the condenser tube, the flask was provided with a distillation tower, a condenser tube connected with the distillation tower, and a discharge outlet. The temperature of the mixture in the flask was raised to about 100° C. under a pressure of 40 kPa to distill ammonia, methanol, and n-butyl acetate until the solid content became 30%, thereby obtaining a mixture containing inorganic fine particles and an organic polymer at a ratio of 70:30. The average particle diameter of the inorganic fine particles in this mixture was 23.9 nm. The average particle diameter was measured by the following method.

Then, 9 g of the mixture containing inorganic fine particles and an organic polymer obtained above, 0.3 g of Desmojule N3200 (available from Sumika Bayer Urethane Co., Ltd.), 0.003 g of di-n-butyltin dilaurate, and 110 g of methyl isobutyl ketone were mixed to prepare a low-refractive index coating agent.

<Ratio of Inorganic Fine Particles and Organic Polymer in Low-Refractive Index Coating Agent>

The low-refractive index coating agent which had been dried at 130° C. under a pressure of 1.33×10 kPa for 24 hours was subjected to elemental analysis, and the ash content was defined as the content of inorganic fine particles in the low-refractive index coating agent.

<Average Particle Diameter>

Using a solution obtained by diluting 1 g of a mixture of inorganic fine particles and an organic polymer with 99 g of b-butyl acetate, a photograph of particles was taken by a transmission electron microscope, and each diameter of arbitrary 100 particles was read to calculate an average of these diameters as an average particle diameter.

<Wet Heat Resistance>

The composite film was allowed to stand in a high-temperature and high-humidity atmosphere of 80° C. and a relative humidity of 95% RH for 1,000 hours, and the transmittance of the film at the maximum absorption wavelength (1,090 nm) of the diimonium dye used was measured, before and after the film was allowed to stand, by a spectrophotometer in the same manner as described above. Then, a difference between the transmittances before and after the film was allowed to stand was obtained to evaluate the stability of the dye in the coating film according to the following criteria. Also, in order to evaluate the adhesion of the coating film to a base material, the crosscut tape peeling test of JIS K5400 was made to evaluate the coating film condition after the peeling test according to the following criteria.

Dye Stability:

○: A change in transmittance at the maximum absorption wavelength of the dye before and after the test was lower than 1%.

Δ: A change in transmittance at the maximum absorption wavelength of the dye before and after the test was not lower than 1% and lower than 3%.

x: A change in transmittance at the maximum absorption wavelength of the dye before and after the test was not lower than 3%.

Adhesion to a Base Material:

○: Not particular x: Peeled

<Heat Resistance>

The coating film was allowed to stand in an atmosphere of 100° C. for 1,000 hours, and the transmittances of the film at the maximum absorption wavelength (1,090 nm) of the diimonium dye used, before and after the film was allowed to stand, by a spectrophotometer in the same manner as described above. Then, a difference between the transmittances before and after the film was allowed to stand was obtained to evaluate the stability of the dye in the coating film according to the following criteria.

Dye Stability:

○: A change in transmittance at the maximum absorption wavelength of the dye before and after the test was lower than 1%.

Δ: A change in transmittance at the maximum absorption wavelength of the dye before and after the test was not lower than 1% and lower than 3%.

x: A change in transmittance at the maximum absorption wavelength of the dye before and after the test was not lower than 3%.

<Bending Property>

The coating film was subjected to a bending test according to JIS K5600 (the edition of 2004) to measure the diameter of a shaft when defects such as cracks or peeling were caused on the bent portions of the coating film, thereby evaluating according to the following evaluation criteria:

○: Good (the diameter of a shaft is 6 mm or smaller);

Δ: Slightly good (the diameter of a shaft is not smaller than 8 mm and not greater than 10 mm); and x: Poor (the diameter of a shaft is not smaller than 12 mm).

<Reflectance>

The surfaces of the film on the side opposite to the antireflection film was roughened using a steal wool, black ink was applied, and a mirror reflection spectrum of the antireflection film side at an incident angle of 5° was measured by a spectrophotometer (UV-3100, available from Shimadzu Corporation), and the wavelength at which the minimum reflectance was shown and that minimum reflectance were determined.

TABLE 3

| | | | Results of evaluation |
|---|---|---|---|
| Wet heat resistance (80° C., 95% RH) | Stability of dye | After 1,000 hours | ○ |
| | Adhesion to base material | After 1,000 hours | ○ |
| Heat resistance (100° C.) | | After 1,000 hours | ○ |
| Bending characteristics of coating film | | | ○ |
| Reflectance | | Initial value | 0.25% |
| | | After 500 hours from wet heat resistance test (80° C., 95% RH) | 0.26% |

Example 15

A hard coat layer and a low-refractive index layer were laminated in this order on the film obtained in Example 12 on the side opposite to the heat ray shielding layer in the same manner as described in Example 14. A composite film having an antireflection property and a heat ray shielding property was produced in this manner. The composite film obtained had a reflectance of 0.25% at a wavelength of 550 nm, a transmittance of 34% at a wavelength of 871 nm, and a transmittance of 30% at a wavelength of 1090 nm. The transmittance was measured by a spectrophotometer (UV-3100, available from Shimadzu Corporation).

Example 16

Figure 2:
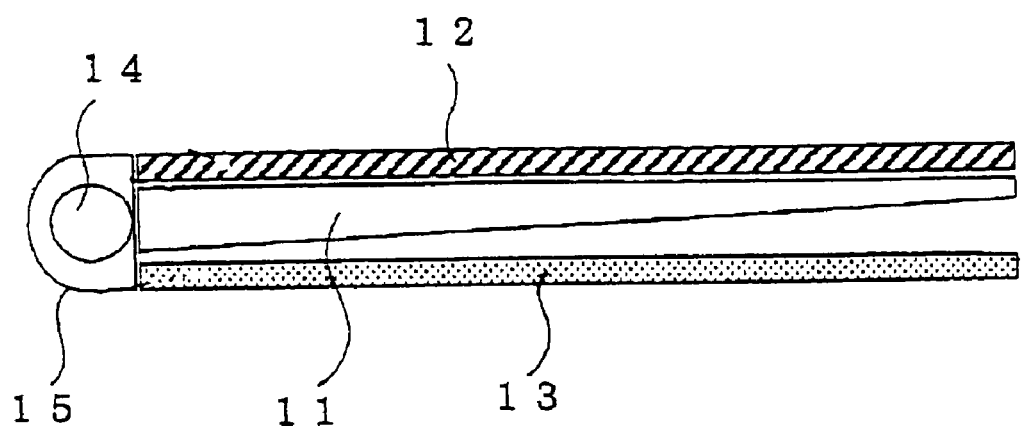
FIG. 2 is a schematic view of a back light unit produced in each of Examples 16 and 18.

A coating composition obtained by mixing and stirring by a stirrer in the following manner was applied to one surface of the film obtained in Example 1 such that the dry thickness of the light diffusion layer to be obtained was 15 μm, and cured. The diffusion film obtained was incorporated into a back light unit (shown in FIG. 2) as a light diffusion layer on the side opposite to the light guide plate. The back light unit was allowed to stand in a thermostatic chamber at 60° C. for 72 hours, and then observed whether the light diffusion sheet was warped or not: however, no warpage was found. In FIG. 2, "11" designates the light guide plate, "12" designates a diffusion sheet (or a diffusion film), "13" designates a reflection sheet, "14" designates a fluorescent tube, and "15" designates a reflector.

Whether the sheet was warped or not was judged based on whether luminescent unevenness arose on the surface of the light diffusion sheet by turning on a lamp of the back light unit.

<Composition of Light Diffusion Layer>

Acrylic binder (RUB Medium Clear, available from Dainichi Seika Industry Corporation): 100 parts Acrylic resin type beads (NT-2, available from NOF Corporation): 14 parts Colloidal silica (Snowtex, available from Nissan Chemical Industries, Ltd.; average particle diameter, 0.015 μm): 20 parts Example 17

The pellets of the lactone ring-containing polymer obtained in Production Example 3 were subjected to injection molding to produce a sheet formed article having a size of 150 mm×150 mm×3 mm.

The sheet formed article obtained had a total light transmittance of 92%, a haze of 0.3%, and a retardation of 8 nm at a wavelength of 590 nm.

Example 18

The pellets of the lactone ring-containing polymer obtained in Production Example 3 were subjected to injection molding to produce a wedge light guide plate having a size of 200 mm×200 mm, a maximum thickness of 5 mm, and a minimum thickness of 2 mm.

The wedge light guide plate obtained was used to produce aback light unit as shown in FIG. 2. As a result, no luminescent unevenness was found. In FIG. 2, "11" designates the light guide plate, "12" designates a diffusion sheet (or a diffusion film), "13" designates a reflection sheet, "14" designates a fluorescent tube, and "15" designates a reflector.

Example 19

First, 20 Parts of acrylic type fine particles (Epostar MA, available from Nippon Shokubai Co., Ltd.) was melt-kneaded with 80 parts of the lactone ring-containing polymer pellets obtained in Production Example 3, and then, the mixture was subjected to injection molding to produce a sheet formed article having a size of 150 mm×150 mm×3 mm.

The sheet formed article obtained had a total light transmittance of 85% and a haze of 75%, showing that it had sufficient characteristics as a diffusing plate.

Example 20

The lactone ring-containing polymer pellets obtained in Production Example 5 and an acrylonitrile-styrene (AS) resin (TOYOAS AS20, available from Toyo-Styrene Co., Ltd.) were kneaded at a mass ratio of 90:10 (i.e., lactone ring-containing polymer:AS resin=90:10) by using a single screw extruder (φ=30 mm) to obtain transparent pellets of a thermoplastic resin composition. The thermoplastic resin composition obtained had a glass transition temperature of 127° C.

This thermoplastic resin composition was dissolved in methyl ethyl ketone to produce a non-stretched film having a thickness of 60 μm by a solution casting method. Also, this film was stretched uniaxially 1.5 times at a stretching rate of 0.1 m/min. to obtain a stretched film having a thickness of 50 μm. The optical characteristics of these non-stretched film and stretched film were evaluated. The results are shown in Table 4.

Example 21

The lactone ring-containing polymer and an AS resin were kneaded at a mass ratio of 80:20 by using a single screw extruder in the same manner as described in Example 20 to obtain transparent pellets of a thermoplastic resin composition. The thermoplastic resin composition obtained had a glass transition temperature of 125° C.

This thermoplastic resin composition was used to produce a non-stretched film having a thickness of 50 μm in the same manner as described in Example 20. Also, this film was stretched uniaxially 1.5 times in the same condition as described in Example 20 to obtain a stretched film having a thickness of 45 μm. The optical characteristics of these non-stretched film and stretched film were evaluated. The results are shown in Table 4.

Example 22

The lactone ring-containing polymer pellets obtained in Production Example 6 and an acrylonitrile-styrene (AS) resin (Stylac (R)-AS783, available from Asahi Kasei Corporation) were kneaded at a mass ratio of 90:10 (i.e., lactone ring-containing polymer:AS resin=90:10) by using a single screw extruder to obtain transparent pellets of a thermoplastic resin composition. The thermoplastic resin composition obtained had a glass transition temperature of 128° C.

This thermoplastic resin composition was used to produce a non-stretched film having a thickness of 72 μm in the same manner as described in Example 20. Also, this film was stretched uniaxially 1.5 times in the same condition as described in Example 20 to obtain a stretched film having a thickness of 55 μm. The optical characteristics of these non-stretched film and stretched film are evaluated. The results are shown in Table 4.

Comparative Example 3

Only the pellets of the lactone ring-containing polymer obtained in Production Example 5 was used to produce a non-stretched film having a thickness of 50 μm by a solution casting method. This film was stretched uniaxially 1.5 times in the same condition as described in Example 20 to obtain a stretched film having a thickness of 40 μm. The optical characteristics of these non-stretched film and stretched film were evaluated. The results are shown in Table 4.

As can be seen from Table 4, the films of Examples 20, 21, and 22 was made of a lactone ring-containing polymer to which an acrylonitrile-styrene (AS) resin was added, and therefore, the in-plane retardation was not greatly changed before and after the stretching treatment and falls within a specific range (i.e., 20 nm or smaller). Also, even if an AS resin is added, the glass transition temperature and total light transmittance are not greatly changed, and the transparency and heat resistance, which are originally possessed by lactone ring-containing polymers, are not deteriorated.

On the other hand, if an AS resin is not added, the film has excellent transparency and heat resistance; however, when stretched, the film has a great in-plane retardation, so that the film is not suitable for optical applications.

It is understood that the optical planar thermoplastic resin composition (B) comprising, as main components thereof, a lactone ring-containing polymer and a thermoplastic resin compatible thermodynamically with the polymer has excellent optical isotropy in addition to excellent transparency and heat resistance.

INDUSTRIALLY APPLICABILITY

The optical planar thermoplastic resin composition of the present invention can be used as optical transparent polymer materials suitable for flat displays such as liquid crystal display devices, plasma displays, and organic EL display devices, infrared sensors, optical waveguides, and the like. Particularly, the optical planar thermoplastic resin composition of the present invention is suitable for optical applications such as optical protective films, optical films, and optical sheets.

The invention claimed is:

1. A polarizing plate having a polarizer and an optical protective film protecting the polarizer, wherein the optical protective film is a thermoplastic resin film comprising a lactone ring-containing polymer in a content of from 50% to 100% by mass, and the lactone ring-containing polymer has a lactone ring structure represented by following formula (1):

TABLE 4

| | Optical planar thermoplastic resin composition (B) | Thickness (μm) | Glass transition temperature (° C.) | In-plane retardation per 100 μm (nm) | Total light transmittance (%) |
|---|---|---|---|---|---|
| Ex. 20 | Non-stretched film | 60 | 127 | 0.5 | 93.5 |
| | Stretched film | 50 | | 2.8 | 93.0 |
| Ex. 21 | Non-stretched film | 50 | 125 | 1.0 | 92.3 |
| | Stretched film | 45 | | 5.3 | 92.9 |
| Ex. 22 | Non-stretched film | 72 | 128 | 0.5 | 92.8 |
| | Stretched film | 55 | | 1.7 | 93.0 |
| Comp. Ex. 3 | Non-stretched film | 50 | 131 | 1.2 | 93.0 |
| | Stretched film | 40 | | 33.5 | 93.1 |

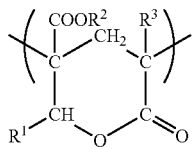
(1)

wherein $R^1$, $R^2$ and $R^3$ each independently represents a hydrogen atom or an organic residue having from 1 to 20 carbon atoms wherein the optical protective film has an in-plane retardation of from 20 to 500 nm.

2. The polarizing plate according to claim 1, wherein the optical protective film is a stretched film having a stretching ratio defined by an area ratio of from 1.3 to 10.

3. The polarizing plate according to claim 1, wherein the optical protective film also functions as a retardation film.

4. The polarizing plate according to claim 1, wherein the ratio (R/Re) of the retardation R at each wavelength to the retardation Re at 590 nm of the optical protective film is from 0.95 to 1.1.

5. The polarizing plate according to claim 3, wherein the ratio (R/Re) of the retardation R at each wavelength to the retardation Re at 590 nm of the optical protective film is from 0.95 to 1.1.

6. The polarizing plate according to claim 1, wherein a functional coating layer is laminated on the optical protective film.

7. The polarizing plate according to claim 6, wherein the functional coating layer is at least one member selected from the group consisting of adhesive and sticky layers, non-glare layers, light diffusion layer, antireflection layers, hard coating layers, ultraviolet shielding layers, heat ray shielding layers, and electromagnetic shielding layers.

8. The polarizing plate according to claim 2, wherein the optical protective film has an in-plane retardation of from 20 to 500 nm.

9. The polarizing plate according to claim 8, wherein the optical protective film also functions as a retardation film.

10. The polarizing plate according to claim 8, wherein the ratio (R/Re) of the retardation R at each wavelength to the retardation Re at 590 nm of the optical protective film is from 0.95 to 1.1.

11. The polarizing plate according to claim 9, wherein the ratio (R/Re) of the retardation R at each wavelength to the retardation Re at 590 nm of the optical protective film is from 0.95 to 1.1.

12. The polarizing plate according to claim 2, wherein a functional coating layer is laminated on the optical protective film.

13. The polarizing plate according to claim 12, wherein the functional coating layer is at least one member selected from the group consisting of adhesive and sticky layers, non-glare layers, light diffusion layer, antireflection layers, hard coating layers, ultraviolet shielding layers, heat ray shielding layers, and electromagnetic shielding layers.

* * * * *